(12) United States Patent
Hasei et al.

(10) Patent No.: US 7,667,796 B2
(45) Date of Patent: Feb. 23, 2010

(54) COLOR FILTER SUBSTRATE, METHOD OF MANUFACTURING COLOR FILTER SUBSTRATE, ELECTRO-OPTICAL DEVICE, AND ELECTRONIC APPARATUS

(75) Inventors: Hironori Hasei, Okaya (JP); Akira Inagaki, Suwa (JP)

(73) Assignee: Seiko Epson Corporation (JP)

(*) Notice: Subject to any disclaimer, the term of this patent is extended or adjusted under 35 U.S.C. 154(b) by 613 days.

(21) Appl. No.: 11/383,037

(22) Filed: May 12, 2006

(65) Prior Publication Data

US 2006/0257761 A1    Nov. 16, 2006

(30) Foreign Application Priority Data

May 16, 2005    (JP) .............................. 2005-142195

(51) Int. Cl.
*G02F 1/1335*    (2006.01)
(52) U.S. Cl. .................................... 349/106
(58) Field of Classification Search ................ 349/106, 349/114, 113, 156; 430/7; 347/106, 107
See application file for complete search history.

(56) References Cited

U.S. PATENT DOCUMENTS 6,861,184 B2 *    3/2005    Kawase ................... 430/7
7,090,950 B2    8/2006    Kawase
7,239,364 B2    7/2007    Kawase
7,372,527 B2    5/2008    Kawase

FOREIGN PATENT DOCUMENTS

| JP | 09-304757 | 11/1997 |
|----|-----------|---------|
| JP | 11-183892 | 7/1999 |
| JP | 2000-266921 | 9/2000 |
| JP | 2003-177232 | 6/2003 |
| JP | 2003-185824 | 7/2003 |
| JP | 2003-195289 | 7/2003 |
| JP | 2003-255122 | 9/2003 |

* cited by examiner

Primary Examiner—Thoi V Duong
(74) Attorney, Agent, or Firm—Harness, Dickey & Pierce, P.L.C.

(57) ABSTRACT

There is provided a method of manufacturing a color filter substrate. The method includes forming partition walls on a base member, applying a first functional liquid containing a first resin having translucency to a concave part defined by a surface of the base member and side surfaces of the partition walls, using a droplet discharge apparatus, and applying a second functional liquid containing a second resin having translucency and having transmittance different from that of the first resin to the concave part, using the droplet discharge apparatus.

3 Claims, 16 Drawing Sheets

COLOR FILTER SUBSTRATE, METHOD OF MANUFACTURING COLOR FILTER SUBSTRATE, ELECTRO-OPTICAL DEVICE, AND ELECTRONIC APPARATUS

BACKGROUND

1. Technical Field

The present invention relates to a color filter capable of coloring transmitted light or reflected light, a method of manufacturing the color filter substrate, an electro-optical device including the color filter substrate, and an electronic apparatus including the electro-optical device.

2. Related Art

In a reflective liquid crystal display device including color filters, the outdoor daylight which is incident into the liquid crystal display device to contribute to display is transmitted through the color filters twice, i.e., at the time of incidence and emission. Therefore, there is a problem in that the absorption of display light by the color filters is large, and display becomes dark.

As a liquid crystal display device which can solve this problem, a display device in which a color filter is formed only in a portion of a region in which a reflecting film is formed is known (refer to Japanese Unexamined Patent Application Publication No. 11-183892). Since the display light in this liquid crystal display device is display light in which the colored light which has been transmitted through the color filter, and the non-colored light which is not transmitted through the color filter and is not absorbed by the color filter are mixed together, display becomes bright.

However, in the liquid crystal display device of the above configuration, boundaries among the regions where color filters and the regions where the color filter are not formed are clear, and the boundaries are regularly disposed over all the pixels. Therefore, there is a problem in that an observer might visually recognize these boundaries as lines which should not be naturally displayed at the time of display.

SUMMARY

An advantage of the invention is that it provides a color filter substrate that the structure in pixels of a color filter substrate is not easily recognized visually by an observer, a method of manufacturing a color filter substrate, a electro-optical device including the color filter substrate, and an electronic apparatus including the electro-optical device.

According to a first aspect of the invention, there is provided a method of manufacturing a color filter substrate including: forming partition walls on a base member, applying a first functional liquid containing a first resin having translucency to a concave part defined by a surface of the base member and side surfaces of the partition walls, using a droplet discharge apparatus, and applying a second functional liquid containing a second resin having translucency and having transmittance different from that of the first resin to the concave part, using a droplet discharge apparatus.

According to the above method, the first functional liquid and the second functional liquid which have been applied to the concave part are mixed near a boundary therebetween, and thereby the boundary between the first resin and the second resin becomes obscure. Moreover, for example, even in a case where the second functional liquid is applied after the applied first functional liquid has been dried, the first functional liquid is dissolved again by a solvent included in the second functional liquid to cause the above mixing, and thereby the boundary between the first resin and the second resin will be in an obscure state. Therefore, a transmittance changes continuously from a region in which the first resin is disposed to a region in which the second resin having a transmittance different from the first resin is disposed. Therefore, the structure in pixels of a color filter substrate (specifically, a boundary between the first resin and the second resin) is not easily recognized visually by an observer. This effect can also be achieved in any one of a case in which the first functional liquid and the second functional liquid are disposed in different regions in the concave part, a case in which the first functional liquid is disposed in a portion of the concave part and the second functional liquid is disposed in the whole concave part so as to cover the first functional liquid, and a case in which the first functional liquid is disposed in the whole concave part, and the second functional liquid is disposed in a portion of the first functional liquid.

In the method of manufacturing a color filter substrate, preferably, the first resin is substantially transparent and the second resin contains a pigment and corresponds to one color. At this time, the region in which the first resin is disposed has less absorption of light and higher luminance than the region in which the first resin is not disposed, but only the second resin is disposed. In this way, according to the above method, color filter substrates having different luminances according to regions in the concave part can be manufactured.

Here, the second functional liquid application may include applying a plurality of the second functional liquids corresponding to different colors to the concave parts which are different from one another. According to this method, a color filter substrate applicable to an electro-optical device capable of performing a color display can be manufactured.

Moreover, the base member has a reflecting film on a portion of the surface thereof, and the first functional liquid application may include applying the first functional liquid to at least a portion of the region of the concave part in which the reflecting film is disposed. According to this method, in the region (hereinafter referred to as "reflective region") of the concave part in which the reflecting film is disposed, the first resin which is transparent and the second resin (hereinafter, an element in which a resin containing a pigment is fixed on the base member is also referred to as "coloring element") containing a pigment coexist, while only a coloring element is disposed in the region (hereinafter referred to as "transmissive region") in which no reflecting film is disposed. Therefore, the reflectance in the reflective region can be improved, while maintaining the color-developing property of the light that is transmitted through the transmissive region.

In the method of manufacturing a color filter substrate, the first resin and the second resin may contain pigments whose hues are almost the same. At this time, the region in which the first resin is disposed has absorption of light and luminance that are different from the region in which without the first resin is not disposed, but only the second resin is disposed. In this way, according to the above method, color filter substrates having different luminances according to regions in the concave part can be manufactured.

Moreover, the first functional liquid application may include applying a plurality of the first functional liquids corresponding to different colors to the concave parts which are different from one another, and the second functional liquid application may include applying the second functional liquids whose hues of corresponding colors are almost the same as those of the first functional liquids, respectively, and which are the same kind as the first functional liquids such that each of the first functional liquids and each of the second functional liquid whose hues are almost the same are disposed in the same concave part. Furthermore, the base member may have a reflecting film on a portion of the surface thereof, and the transmittance of the first resin may be lower than the transmittance of the second resin, and the first functional liquid application may include applying at least a portion of the region of the concave part, in which the reflecting film is not disposed. By such a method, similar to the above, the color-developing property of the light that is transmitted through the transmissive region is excellent, and thus a color filter substrate with high reflectance in the reflective region can be manufactured.

In the method of manufacturing a color filter substrate, the second functional liquids may correspond to three colors of red, green, and blue. According to this method, a color filter substrate applicable to three primary colors of red, green, and blue can be manufactured.

In the method of manufacturing a color filter substrate, the second functional liquid application includes applying the second functional liquids to a region of the concave part except the region in which the first functional liquid is applied. According to this method, the first resin contained in the first functional liquid, and the second resin contained in the second functional liquid are disposed in different regions without lamination thereof. Therefore, the light that is transmitted through or the light that is reflected by a color filter substrate is absorbed only by either the first resin or the second resin. Therefore, characteristics including the color and luminance of the light can be approximated to desired values more easily.

According to a second aspect of the invention, there is provided a color filter substrate manufactured by the above method of manufacturing a color filter substrate. Moreover, according to a third aspect of the invention, there is provided a color filter substrate including partition walls formed on a base member, and a coloring element disposed in a concave part defined by the surface of the base member and side surfaces of the partition walls. The coloring element has a region in which density changes continuously along a direction parallel to the surface of the base member. In such a color filter substrate, its transmittance changes continuously along the direction parallel to the surface of the base member. Therefore, the structure in pixels of a color filter substrate (specifically, a boundary between the first resin and the second resin) is not easily recognized visually by an observer.

The above color filter substrate includes a color filter substrate having, in one concave part, a plurality of coloring elements whose density is fixed, and coloring elements which are disposed between the color elements and whose density changes continuously; a color filter substrate having, in one concave part, a coloring element whose density is fixed and the density adjacent to which changes continuously; and a color filter substrate having, in one concave part, a single coloring element whose density changes continuously.

According to a fourth aspect of the invention, there is provided an electro-optical device including the above color filter substrate. Since such an electro-optical device makes it hard for an observer to visually recognize the structure in pixels of a color filter substrate, a high-definition display can be performed.

According to a fifth aspect of the invention, there is provided an electronic apparatus including the above electro-optical device. Since such an electronic apparatus makes it hard for an observer to visually recognize the structure in pixels of a color filter substrate, a high-definition display can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

A. Color Filter Substrate

Figure 4A:
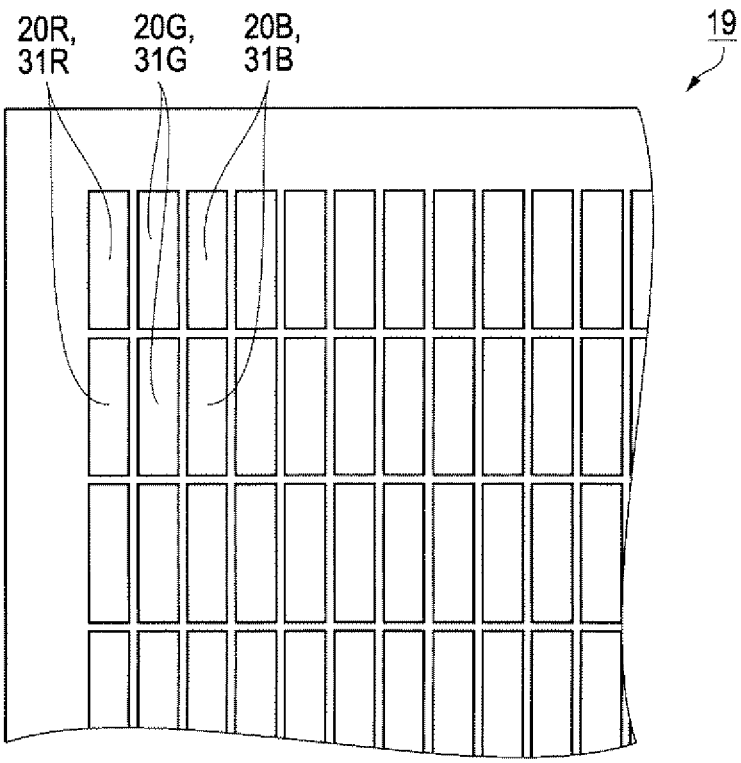
FIG. 4A is a plan view showing a pixels part of a color filter substrate.
Figure 4B:
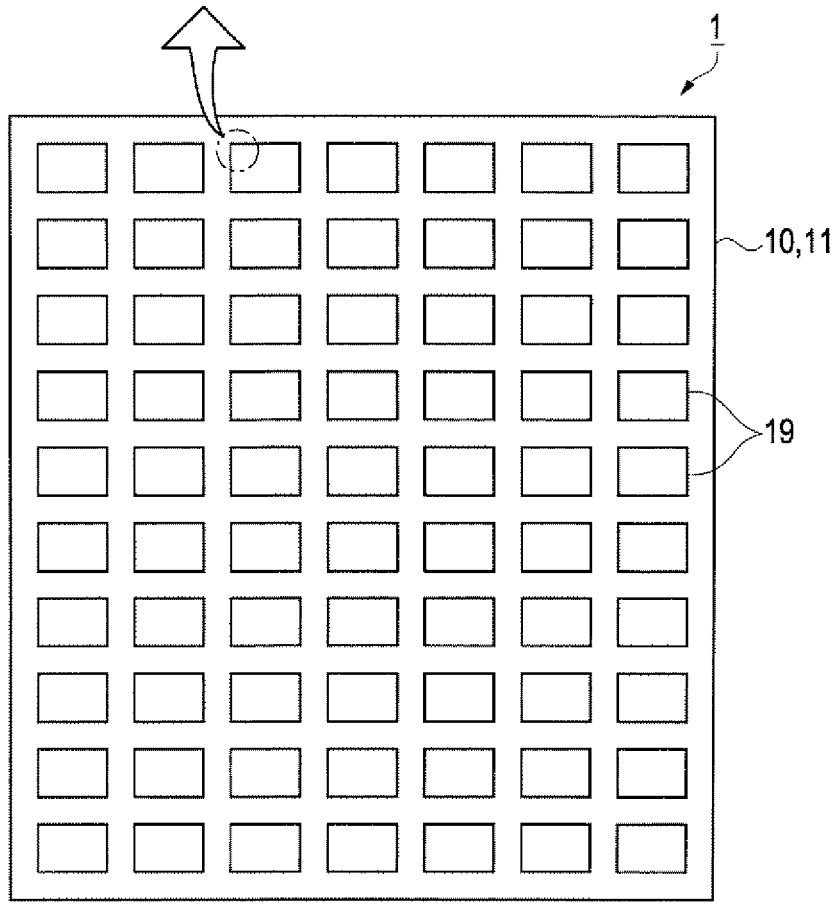
FIG. 4B is a plan view of the whole color filter substrate.

FIG. 4B is a plan view of a color filter substrate 1 manufactured using a method of manufacturing a color filter substrate according to the invention. The color filter substrate 1 has a base member 10 including a glass substrate 11, and a red coloring element 31R disposed on the base member 10, a green coloring element 31G, and a blue coloring element 31B (refer to FIG. 4A).

Figure 14:
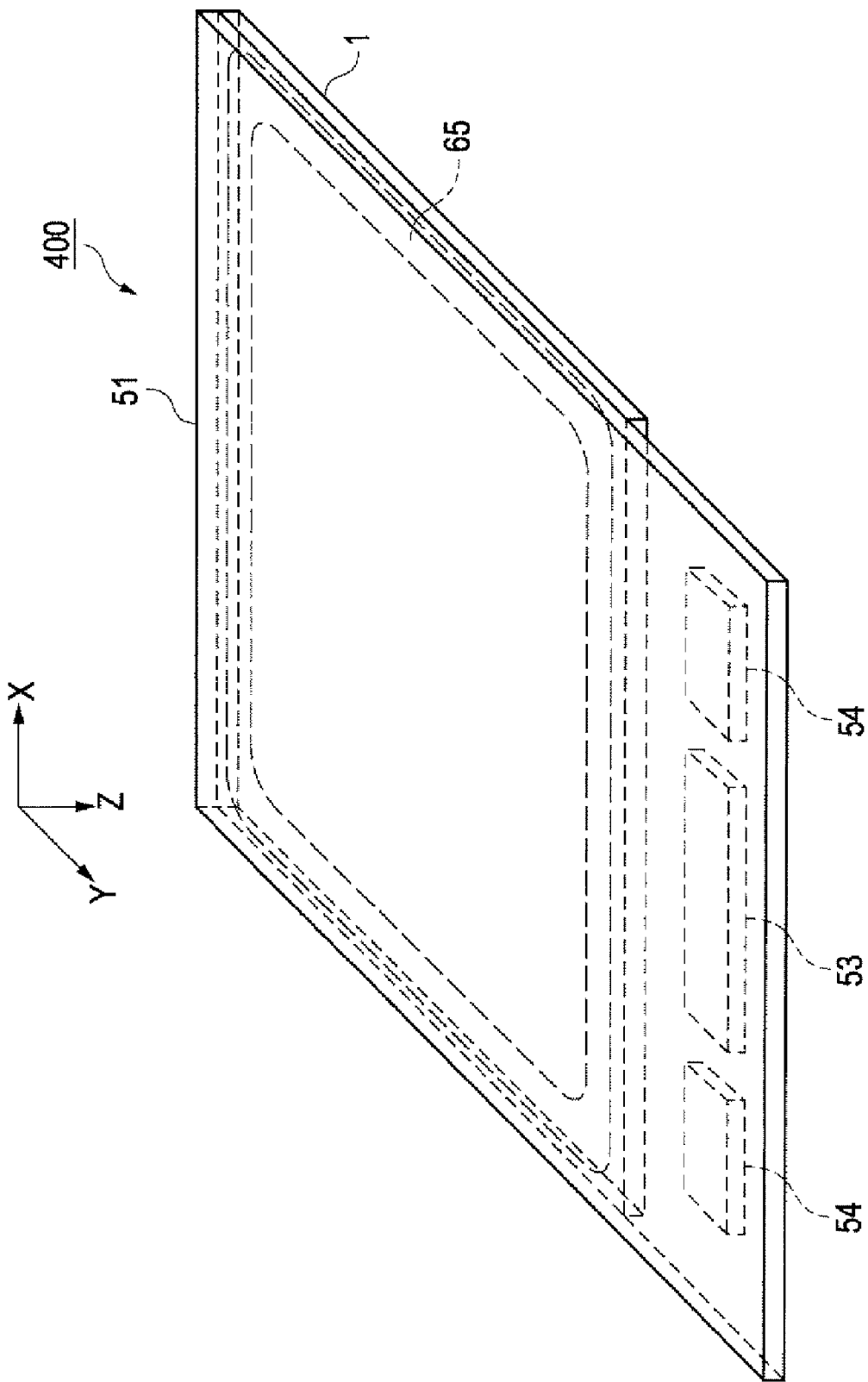
FIG. 14 is a perspective view of a liquid crystal display device.

The color filter substrate 1 has a plurality of regions 19 which are vertically and horizontally disposed in a matrix and which are corresponding to pixels, respectively, of a liquid crystal display device 400 (refer to FIG. 14). The drawing in which, while paying attention to one of the regions 19, a portion of the one region is enlarged is FIG. 4A. As can be seen from this drawing, each region 19 includes a large number of red pixels 20R, green pixel 20G, and blue pixel 20B, and these pixels are regularly arranged repeatedly in this order (in the following, the pixels 20R, 20G and 20B are also collectively referred to as pixels 20). A red coloring element 31R, a green coloring element 31G, and a blue coloring element 31B are disposed in the pixels 20R, 20G, and 20B, respectively. A square region including the pixel 20R, 20G, and 20B one by one is called a pixel, and constitutes a minimum unit when the liquid crystal display device 400 performs display.

Figure 5A:
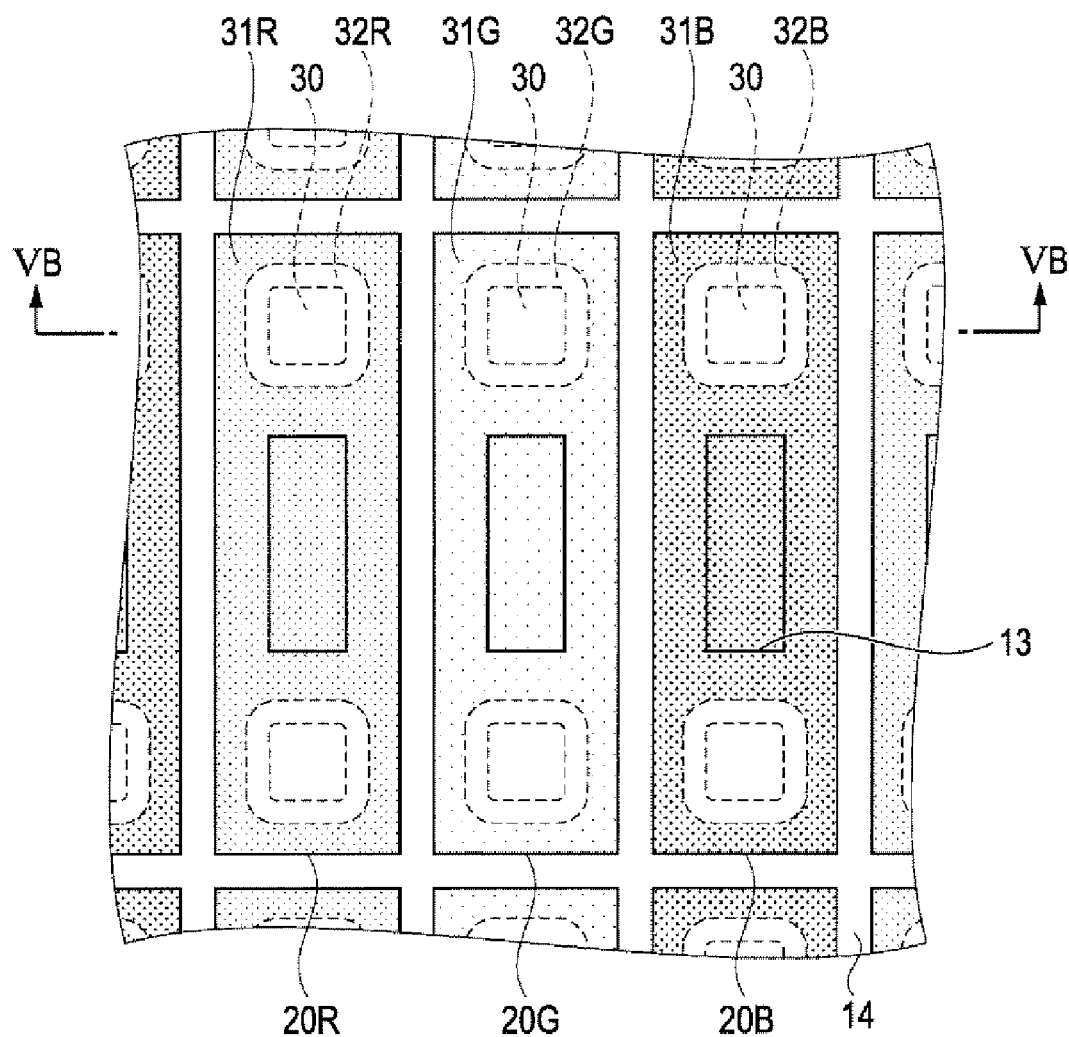
FIG. 5A is an enlarged plan view of pixels of the color filter substrate.
Figure 7A:
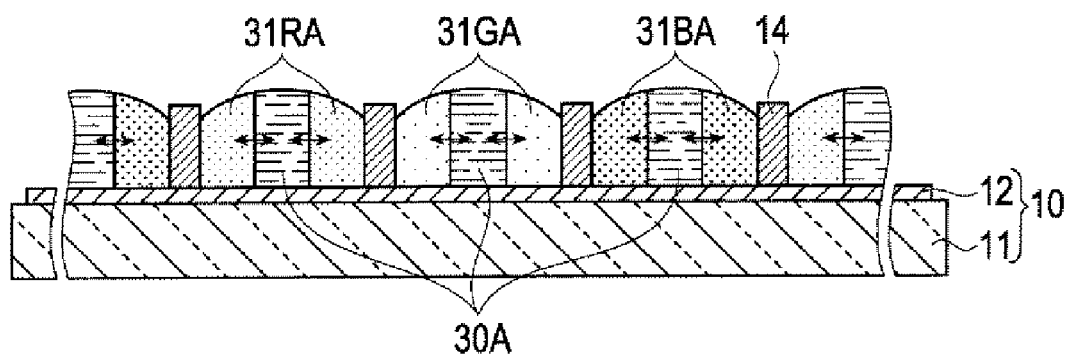
FIGS. 7A to 7C are sectional side views showing a method of manufacturing a color filter substrate.
Figure 7B:
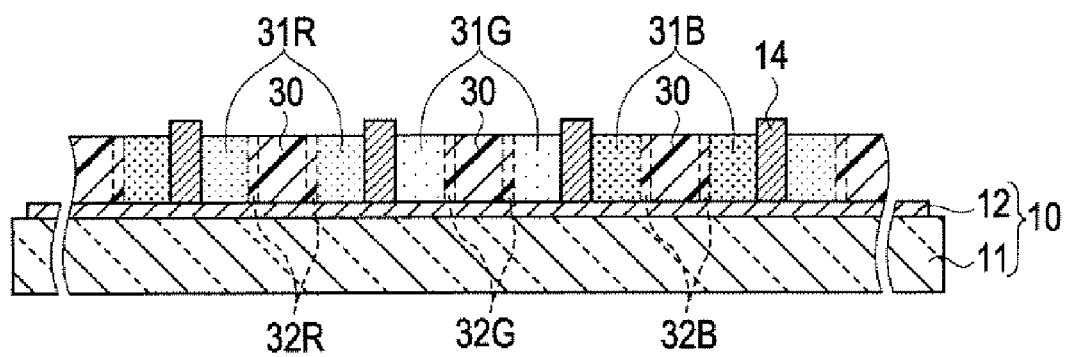
Figure 7C:
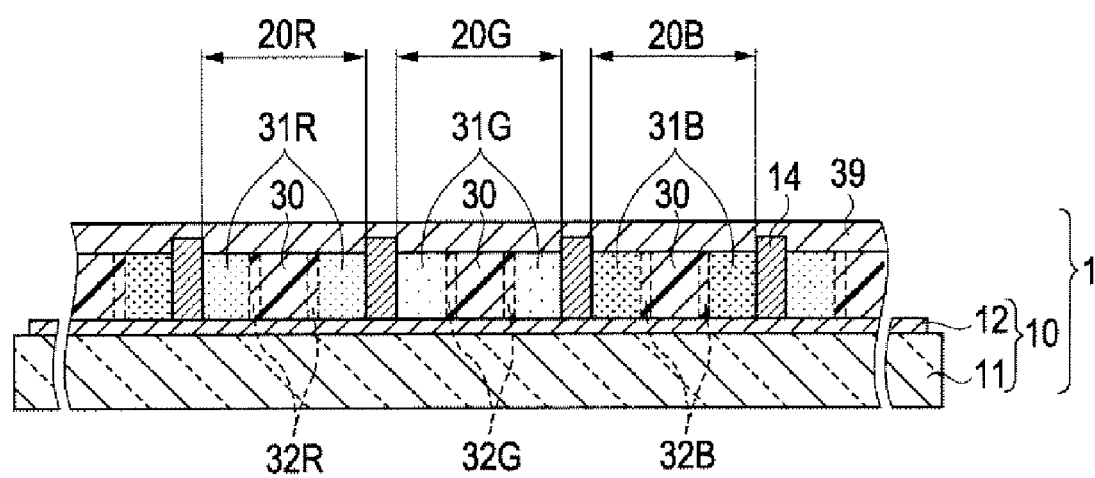

FIG. 5A is an enlarged plan view showing the pixels 20 of the color filter substrate 1, and the sectional side view taken along the A-A line in this drawing is FIG. 7C. Hereinafter, the detailed structure of the color filter substrate 1 will be described with reference to these drawings.

The color filter substrate 1 has the base member 10 including the glass substrate 11 and a reflecting film 12 composed of an aluminum thin film formed on the surface of the glass substrate 11 at the observation side. A partition walls 14 made of resin which has a light blocking effect is formed on surface of a base member 10 at the observation side. A region surrounded by the partition walls 14 is equivalent to any one of the pixels 20R, 20G, and 20B. Moreover, the above-described reflecting film 12 has a transmission hole 13 in the center of each pixel 20. A region of the pixel 20 where the reflecting film 12 is disposed is a reflective region, and a region of the pixel corresponding to the transmission hole 13 is a transmissive region.

A transparent resin 30, a coloring element 31R, and a coloring element 32R are disposed in a concave part of the region corresponding to the pixel 20R, which is defined by the surface of the base member 10 and the side surfaces of the partition walls 14. The transparent resin 30 is disposed in a portion of the reflective region, and surrounded by the coloring element 32R. The coloring element 31R is exclusively disposed in a region of the reflective region, in which the transparent resin 30 and the coloring element 32R are not disposed, and is also disposed in the whole transmissive region. The coloring elements 31R and 32R are obtained by fixing a resin containing a pigment, which absorbs a specific wavelength component of the light to be transmitted therethrough to color the transmitted light. On the other hand, the transparent resin 30 is substantially transparent and does not color transmitted light.

According to the above configuration, since all the light that is incident from the back side, is transmitted through the transmissive region, and is emitted to the observation side is transmitted through the coloring element 31R, a color-developing property becomes high. On the other hand, since the light that is incident into the reflective region from the observation side, is reflected by the reflecting film 12, and is emitted to the observation side includes both the light that has been transmitted through the coloring elements 31R and 32R, and the light that has been transmitted through the transparent resin 30, luminance becomes high compared with the case where the coloring element 31R is disposed on the whole surface. In this way, the color filter substrate 1 has the features that the color-developing property of the light that is transmitted through the transmissive region is high and the reflectance in the reflective region is high. Here, the reflectance refers to the ratio of the quantity of the light that is reflected by the reflecting film 12 and emitted to the observation side to the quantity of the light that is incident into the color filter substrate 1 from the observation side.

Figure 5B:
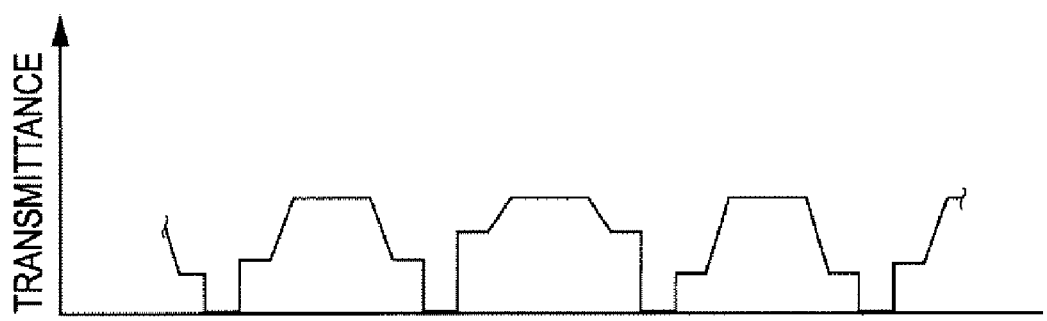
FIG. 5B is a graph showing the transmittance distribution in the pixels.

Here, the coloring element 32R has the feature that the density of a pigment changes continuously along a direction parallel to the surface of the base member 10. More specifically, the portion of the coloring element 32R which touches the coloring element 31R has the same pigment density as the coloring element 31R, while the portion of the coloring element 32R which touches the transparent resin 30 is substantially transparent similarly to the transparent resin 30. Thus, the portion between the above portions has pigment densities that change continuously. If this is put in another way from the viewpoint of transmittance, the transmittance changes continuously from the region in which the coloring element 31R is disposed through the region in which the coloring element 32R is disposed to the region in which the transparent resin 30 is disposed. The features of such a transmittance are shown in FIG. 5B. FIG. 5B is a graph obtained by plotting transmittance along the A-A line in FIG. 5A. As can be seen from this drawing, in the region in which the coloring element 31R is disposed and the region in which the transparent resin 30 is disposed, a fixed transmittance is shown according to the characteristics of each resin, and transmittance changes continuously in the region in which the coloring element 32R between the regions is disposed.

Since the color filter substrate 1 has the region whose transmittance changes continuously between the coloring element 31R and the transparent resin 30 as described above, it has the feature that the internal structure (specifically, the boundary between the coloring element 31R and the transparent resin 30) is not easily recognized visually by an observer.

In addition, the color filter substrate 1 further has the pixel 20G and the pixel 20B which have the same configuration as the above-described pixel 20R. The above description of the pixel 20R becomes description of the pixel 20G or the pixel 20B by reading "R" as "G" or "B", respectively.

B-1. Entire Configuration of Droplet Discharge Apparatus

Figure 1:
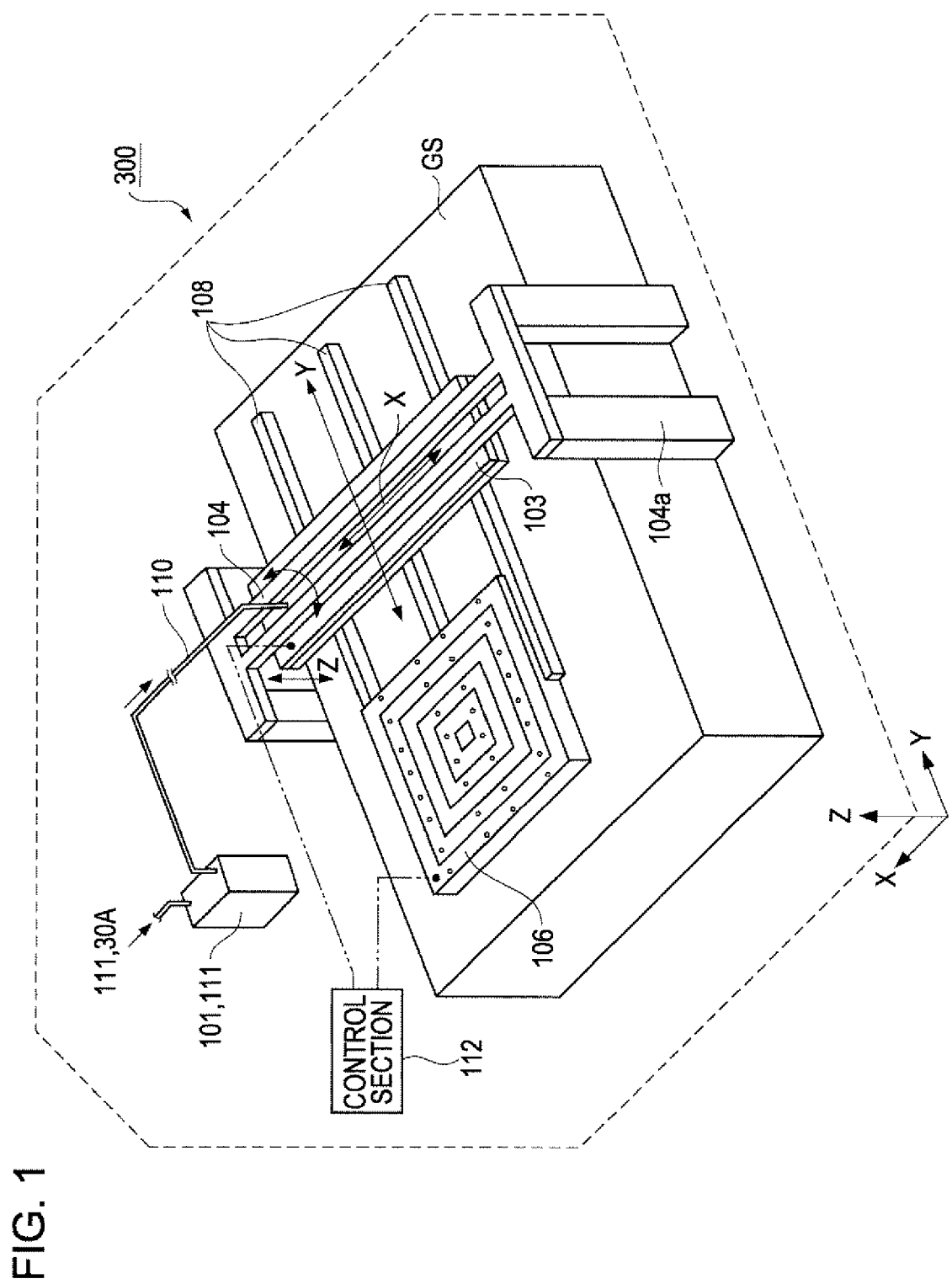
FIG. 1 is a perspective view showing a droplet discharge apparatus.

Next, the entire configuration of a droplet discharge apparatus 300 used for manufacture of the color filter substrate 1 will be described referring FIG. 1. The droplet discharge apparatus 300 shown in FIG. 1 is basically an ink jet apparatus for discharging a liquid material 111 (first functional liquid 30A). More specifically, the droplet discharge apparatus 300 includes a tank 101 which holds the liquid material 111, a tube 110, a grand stage GS, a discharge head section 103, a stage 106, a first positional controller 104, a second positional controller 108, a control section 112, and a support 104a. In addition, since droplet discharge apparatuses (not shown) for discharging second functional liquids 31RA, 31GA, and 31BA (refer to FIGS. 6 and 7) basically have the same configuration and functions as the droplet discharge apparatus 300 except that the materials to be discharged are different, description thereof is omitted.

The discharge head section 103 holds a head 114 (refer to FIG. 2). This head 114 discharges droplets of the liquid material 111 according to signals from the control section 112. In addition, the head 114 in the discharge head section 103 is connected with the tank 101 by the tube 110, and therefore, the liquid material 111 is supplied to the head 114 from the tank 101.

The stage 106 provides a flat surface for fixing the base member 10. Furthermore, the stage 106 also has a function to fix the position of the base member 10 using a suction force.

The first positional controller 104 is fixed at a predetermined height of position from the grand stage GS by the support 104a. This first positional controller 104 has a function to move the discharge head section 103 along an X-axis direction and a Z-axis direction orthogonal to the X-axis direction according to signals from the control section 112. Furthermore, the first positional controller 104 also has a function to rotate the discharge head section 103 around an axis parallel to the Z-axis. Here, in this Embodiment, the Z-axis direction is a direction parallel to the vertical direction (that is, the direction of gravitational acceleration).

The second positional controller 108 moves the stage 106 in the Y-axis direction on the grand stage GS according to signals from the control section 112. Here, the Y-axis direction is a direction orthogonal to both the X-axis direction and the Z-axis direction.

The configuration of the first positional controller 104 and the configuration of the second positional controller 108 which have the above-described functions can be implemented using the well-known XY robot using a linear motor or a servo motor. Therefore, description of the detailed configuration thereof is omitted herein.

Meanwhile, as described above, the discharge head section 103 is moved in the X-axis direction by the first positional controller 104. And, the base member 10 is moved in the Y-axis direction along with the stage 106 by the second positional controller 108. As a result, the position of the head 114 relative to the base member 10 changes. More specifically, these operations move the discharge head section 103, the head 114, or the nozzle 118 (refer to FIG. 2) in the X-axis direction and the Y-axis direction relative to the base member 10 fixed to the stage 106 with a predetermined distance being kept in the Z-axis direction, that is, these operations allow the base member to be scanned. The "relative movement" or "relative scanning" means that at least one of the side from which the liquid material 111 is discharged and the side (a part to be discharged) on which a material to be discharged from the discharge side lands is relatively moved the other one.

The control section 112 is adapted to receive from an external information processor discharge data showing relative positions where droplets of the liquid material 111 should be discharged. The control section 112 storing the received discharge data in an internal storage unit and controls the first positional controller 104, the second positional controller 108, and the head 114 according to the stored discharge data. In addition, the discharge data are data used to apply the liquid material 111 onto the base member 10 in a predetermined pattern. In this embodiment, the discharge data have a form of bit map data.

The droplet discharge apparatus 300 having the above configuration moves the nozzle 118 (refer to FIG. 2) of the head 114 relative to the base member 10 according to the discharge data, and discharges the liquid material 111 from the nozzle 118 towards a part to be discharged.

B-2. Head

Figure 2A:
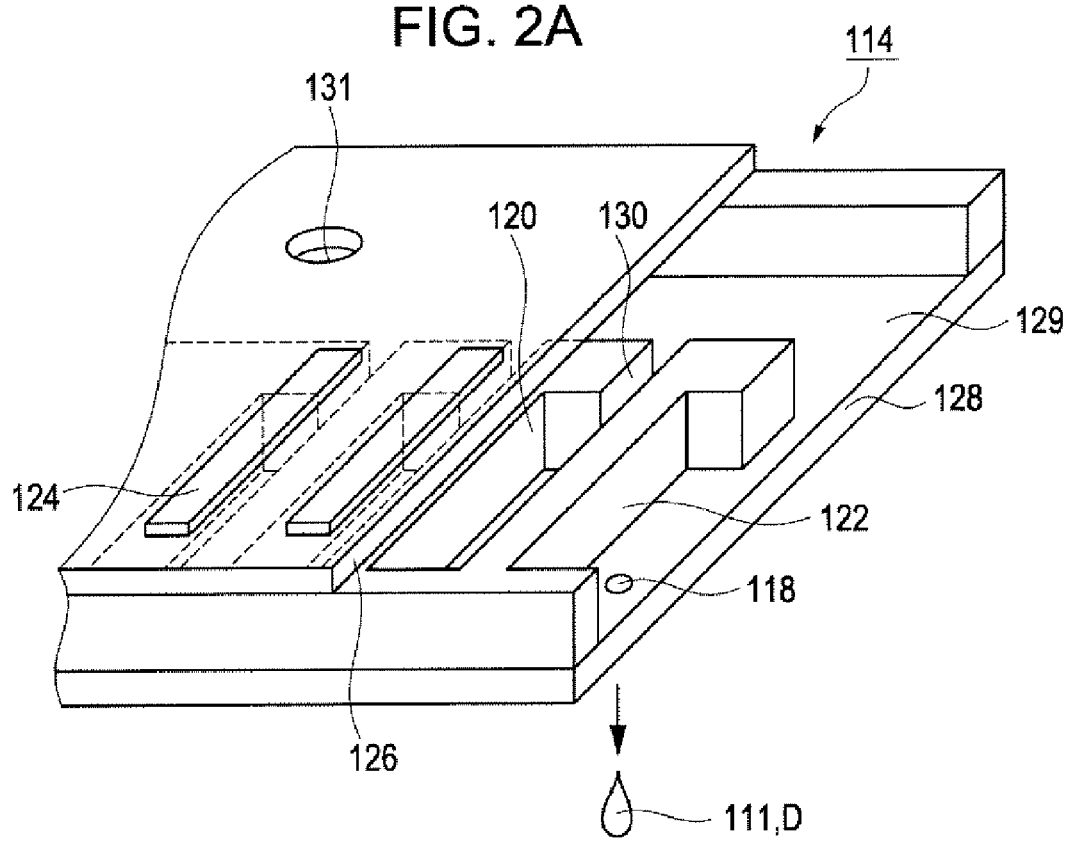
FIG. 2A is a perspective view showing a portion of a head in the droplet discharge apparatus.
Figure 2B:
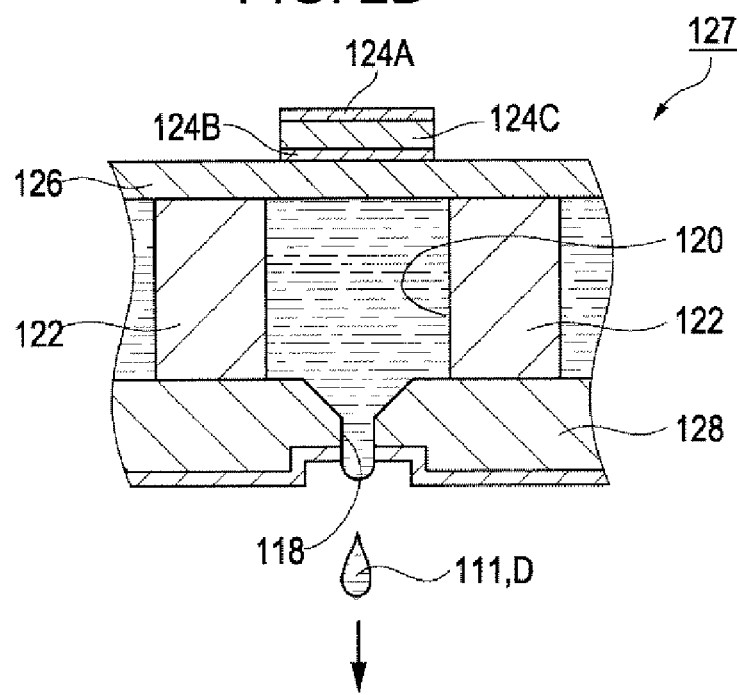
FIG. 2B is a sectional side view showing the portion of the head in the droplet discharge apparatus.

As shown in FIGS. 2A and 2B, the head 114 in the droplet discharge apparatus 300 is an ink jet head which has a plurality of the nozzles 118. Specifically, the head 114 includes a diaphragm 126 and a nozzle plate 128 which defines an opening of the nozzle 118. And, a liquid reservoir 129 is located between the diaphragm 126 and the nozzle plate 128 and this liquid reservoir 129 is always filled with a liquid material 111 supplied through a hole 131 from an external tank which is not illustrated.

Moreover, a plurality of partition walls 122 are located between the diaphragm 126 and the nozzle plate 128. And, a portion surrounded by the diaphragm 126, the nozzle plate 128, and a pair of the partition walls 122 is a cavity 120. Since the cavity 120 is formed corresponding to the nozzle 118, the number of cavities 120, and the number of nozzles 118 are the same. The liquid material 111 is supplied to the cavity 120 from the liquid reservoir 129 through a supply port 130 located between the pair of partition walls 122. In addition, in this Embodiment, the diameter of the nozzle 118 is about 27 μm.

Meanwhile, each vibrator 124 is located on the diaphragm 126 so as to correspond to each cavity 120. Each vibrator 124 includes a piezo-electric element 124C and a pair of electrodes 124A and 124B which sandwich the piezo-electric element 124C. The control section 112 applies a driver voltage between the pair of electrodes 124A and 124B to cause droplets D of the liquid material 111 to be discharged from the corresponding nozzle 118. Here, the volume of a material discharged from the nozzle 118 is variable between 0 pl and 42 pl (pico liter). In addition, the shape of the nozzle 118 is adjusted so that droplets D of the liquid material 111 may be discharged from the nozzle 118 in the Z-axis direction.

In the present specification, the part including one nozzle 118, the cavity 120 corresponding to the nozzle 118, and the vibrator 124 corresponding to the cavity 120 are also referred to as "discharge section 127." According to this reference, one head 114 has discharge sections 127 of the same number as the number of nozzles 118. The discharge section 127 may have an electro-thermal transducer instead of the piezo-electric element. That is, the discharge section 127 may have a configuration in which a material is discharged using thermal expansion of a material by the electro-thermal transducer.

B-3. Control Section

Figure 3:
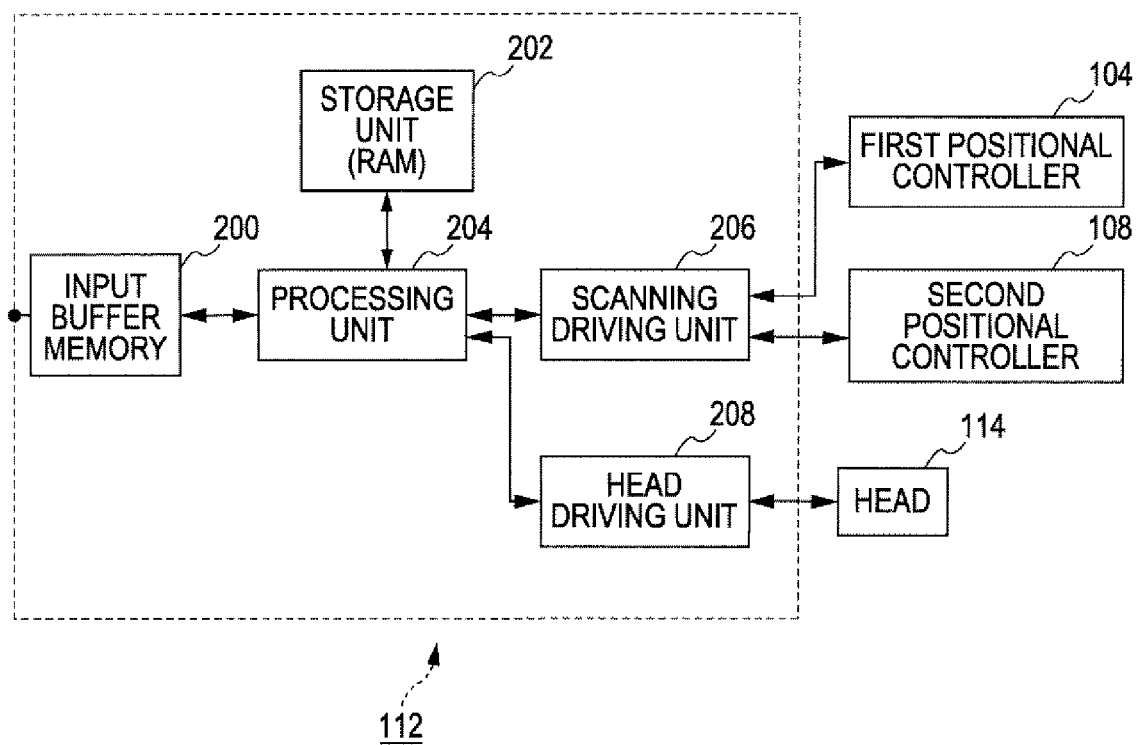
FIG. 3 is a functional block diagram of a control section in the droplet discharge apparatus.

Next, the configuration of the control section 112 will be described. As shown in FIG. 3, the control section 112 includes an input buffer memory 200, a storage unit 202, a processing unit 204, a scanning driving unit 206, and a head driving unit 208. The input buffer memory 200 and the processing unit 204 are communicably connected to each other. The processing unit 204, the storage unit 202, the scanning driving unit 206, and the head driving unit 208 are communicably connected to one another by buses which are not illustrated.

The scanning driving unit 206 is communicably connected to the first positional controller 104 and the second positional controller 108. Similarly, the head driving unit 208 is communicably connected to the head 114.

The input buffer memory 200 receives the discharge data used to discharge droplets of the liquid material 111, from an external information processor (not shown) located outside the droplet discharge apparatus 300. The input buffer memory 200 supplies the discharge data to the processing unit 204, and the processing unit 204 stores the discharge data in the storage unit 202. In FIG. 3, the storage unit 202 is a RAM.

The processing unit 204 supplies the data showing the position of the nozzle 118 relative to a part to be discharged to the scanning driving unit 206 on the basis of the discharge data in the storage unit 202. The scanning driving unit 206 supplies the stage driving signals according to this data and discharge periods to the first positional controller 104 and the second positional controller 108. As a result, the position of the discharge head section 103 relative to a part to be discharged changes. On the other hand, the processing unit 204 supplies discharge signals required for the discharge of the liquid material 111 to the head 114 on the basis of the discharge data stored in the storage unit 202. As a result, droplets D of the liquid material 111 are discharged from the corresponding nozzle 118 in the head 114.

The control section 112 is a computer including a CPU, a ROM, a RAM, and buses. Accordingly, the above functions of the control section 112 are implemented by software programs executed by the computer. Of course, the control section 112 may be implemented by exclusive circuits (hardware).

B-4. Liquid Material

The above-mentioned "liquid material 111" means a material which has the coefficient of viscosity enough to be discharged as droplets D from the nozzle 118 of the head 114. Here, whether the liquid material 111 is oily or aqueous does not matter. The liquid material has only to be a fluid as a whole, if it has fluidity (coefficient of viscosity) enough to allow discharge from the nozzle 118, even if a solid material is mixed therein. Here, the coefficient of viscosity of the liquid material 111 is preferably 1 mPa·s or more and 50 mPa·s or less. If the coefficient of viscosity is 1 mPa·s or more, the periphery of the nozzle 118 is hardly polluted with the liquid material 111 when droplets D of the liquid material 111 are discharged. On the other hand, if the coefficient of viscosity is 50 mPa·s or less, the clogging frequency in the nozzle 118 is small, and, therefore, smooth discharge of droplets D can be realized. In addition, since "the liquid material 111" performs an inherent function after it has been applied to a part to be discharged, it is also called "functional liquid."

The first functional liquid 30A and second functional liquids 31RA, 31GA, and 31BA, which are used in this embodiment, is the liquid materials 111 which satisfies the above-described conditions. The first functional liquid 30A is a liquid in which the transparent resin 30 as a "first resin" is dissolved by a solvent. The second functional liquids 31RA, 31GA, and 31BA are liquids in which resins as "second resins" containing red, green, and blue pigments are dissolved in a solvent, respectively. The things which the resins corresponding to the red, green, and blue are fixed on the base member are called the coloring elements 31R, 31G, and 31B, respectively. In this Embodiment, the solvent of the first functional liquid 30A and the solvent of the second functional liquids 31RA, 31GA, and 31BA are the same liquid. In addition, the liquids which are easy to dissolve may be used for these solvents.

C. Method of Manufacturing Color Filter Substrate

Subsequently, a method of manufacturing a color filter substrate 1 using the above-described droplet discharge apparatus 300 will be described, referring to FIGS. 6 and 7.

Figure 6A:
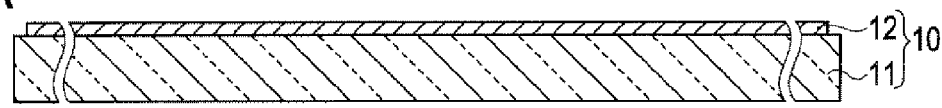
FIGS. 6A to 6D are sectional side views showing a method of manufacturing a color filter substrate.

First, a reflecting film 12 composed of an aluminum thin film is formed on a glass substrate 11 to manufacture a base member 10, using a well-known film-forming technique and a well-known patterning technique (FIG. 6A). At this time, a transmission hole 13 is also formed at the same time.

Figure 6B:
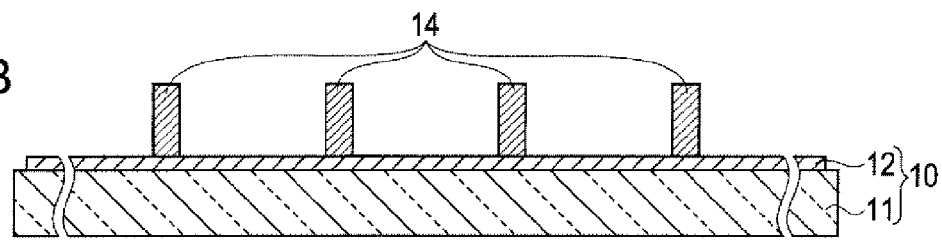
Figure 6C:
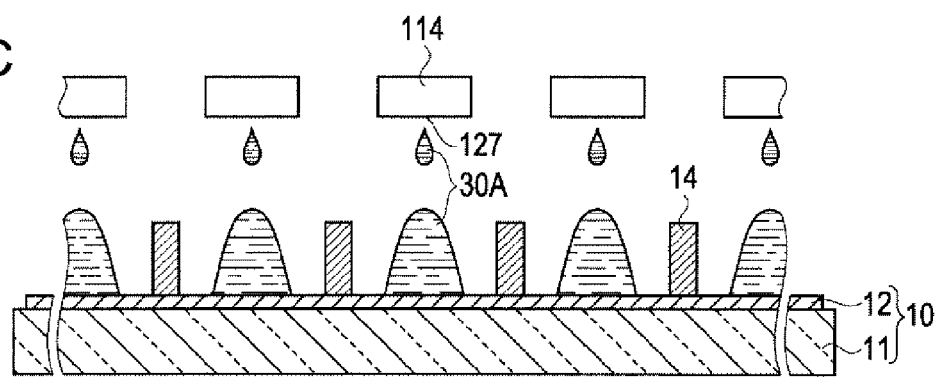

Next, partition walls 14 are formed by applying a resin organic thin film on the base member 10, and patterning this by photolithography (FIG. 6B). This step corresponds to the "first step" in the invention.

The base member 10 on which the partition walls 14 has been formed is carried to the stage 106 of the droplet discharge apparatus 300. Then, as shown in a FIG. 6C, the droplet discharge apparatus 300 applies the first functional liquid 30A from the discharge section 127 of the head 114 to a portion of the region in which the reflecting film 12 is formed, in a concave part defined by the surface of the base member 10, and the side surfaces of the partition walls 14. The applied first functional liquid 30A is disposed in a portion of the concave part, without getting wet and spreading in the whole concave part by its surface tension. This step corresponds to the "second step" in the invention.

Figure 6D:
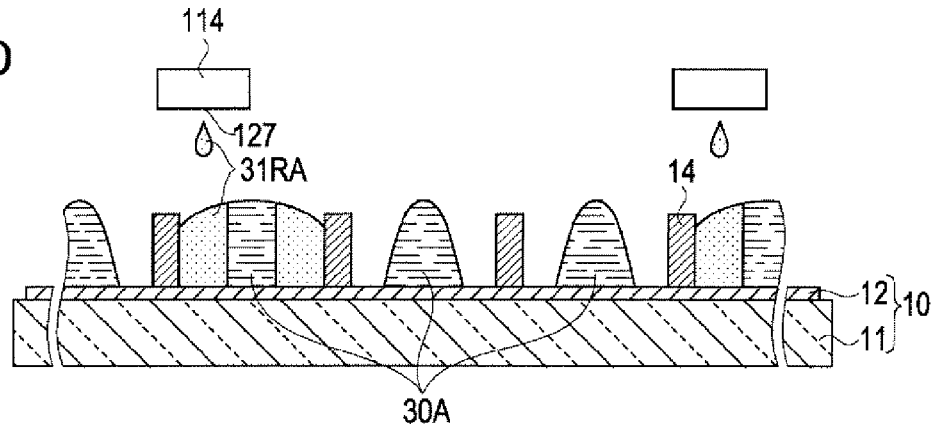

The base member 10 on which the first functional liquid 30A has been applied is carried to the stage 106 of a droplet discharge apparatus for discharging the second functional liquid 31RA. Then, as shown in FIG. 6D, the droplet discharge apparatus applies the second functional liquid 31RA from the discharge section 127 of the head 114 to the region in which the first functional liquid 30A is not applied, in the concave part corresponding to the pixel 20R. At the time when this step has been completed, the concave part corresponding to the pixel 20R will be in a state where it is filled with the first functional liquid 30A and second functional liquid 31RA.

Subsequently, the base member 10 is sequentially carried to a droplet discharge apparatus for discharging the functional liquid 31GA and a droplet discharge apparatus for discharging the functional liquid 31BA, by which the second functional liquid 31GA, and second functional liquid 31BA are applied to the base member (FIG. 7A). The second functional liquid 31GA is applied to the region in which the first functional liquid 30A is not applied, in the concave part corresponding to the pixel 20G, and the second functional liquid 31BA is applied to the region in which the first functional liquid 30A is not applied, in the concave part corresponding to the pixel 20B. In this way, any one kind of liquid of the first functional liquid 30A, and the second functional liquids 31RA, 31GA and 31BA is applied to each of all the pixels 20. The above step of applying the second functional liquids 31RA, 31GA, and 31BA corresponds to the "third step" in the invention.

Here, since the solvent of the first functional liquid 30A and the solvent of the second functional liquids 31RA, 31GA, and 31BA are the same, as indicated by the arrow in FIG. 7A, portions of these functional liquids are mixed in the vicinity of a boundary. The density of a pigment in such a mixed region becomes lower than the coloring element 31R (31G, 31B). As a result, the nearer the region in which the first functional liquid 30A is applied, the higher the distribution thereof becomes, while the nearer the region in which the second functional liquid 31RA (31GA, 31BA) is disposed, the higher the distribution thereof becomes.

Next, the base member 10 in the above state is left and dried in a high temperature environment. After passing through the drying step, the solvent in each functional liquid is evaporated. As a result, the transparent resin 30 is formed in the region in which the first functional liquid 30A is applied, the coloring elements 31R, 31G, and 31B are formed in the region in which the second functional liquids 31RA, 31GA, and 31BA are applied, and the coloring elements 32R, 32G, and 32B which have a region whose pigment density changes continuously are formed in the above-mentioned mixed region (FIG. 7B).

Finally, an overcoat 39 made of resin having translucency is formed so as to cover the transparent resin 30, various coloring elements 31R, 31G, 31B, 32R, 32G, and 32B, and partition walls 14, which are formed above. The formation of the overcoat 39 is performed, for example, using a spin coat method and photolithography. The color filter substrate 1 is completed through the above steps.

D. Liquid Crystal Display Device

Subsequently, the liquid crystal display device 400 as an electro-optical device including the above color filter substrate 1 will be described.

A perspective view of the liquid crystal display device 400 is shown in FIG. 14. The liquid crystal display device 400 is a liquid crystal display device using a nonlinear resistance element which has the color filter substrate 1, an upper glass substrate 51 disposed to face the substrate, a sealing agent 65, an X driver 53, and Y drivers 54. The upper glass substrate 51 and the color filter substrate 1 face each other and are bonded to each other with the sealing agent 65 therebetween, and an observer observes display from the upper glass substrate 51. The liquid crystal 69 is enclosed within the space surrounded by the upper glass substrate 51, the color filter substrate 1, and the sealing agent 65 (refer to FIG. 16). Various electrodes are disposed on the facing surface of the upper glass substrate 51 and the color filter substrate 1 (refer to FIGS. 15 and 16). The X driver 53 and the Y drivers 54 transmit voltage signals required to driven liquid crystal 69 to these electrodes. Furthermore, although optical films, such as a polarizing plate, are disposed on the observation side of the upper glass substrate 51, and the back side of the color filter substrate 1, respectively, their illustration is omitted herein.

Figure 15:
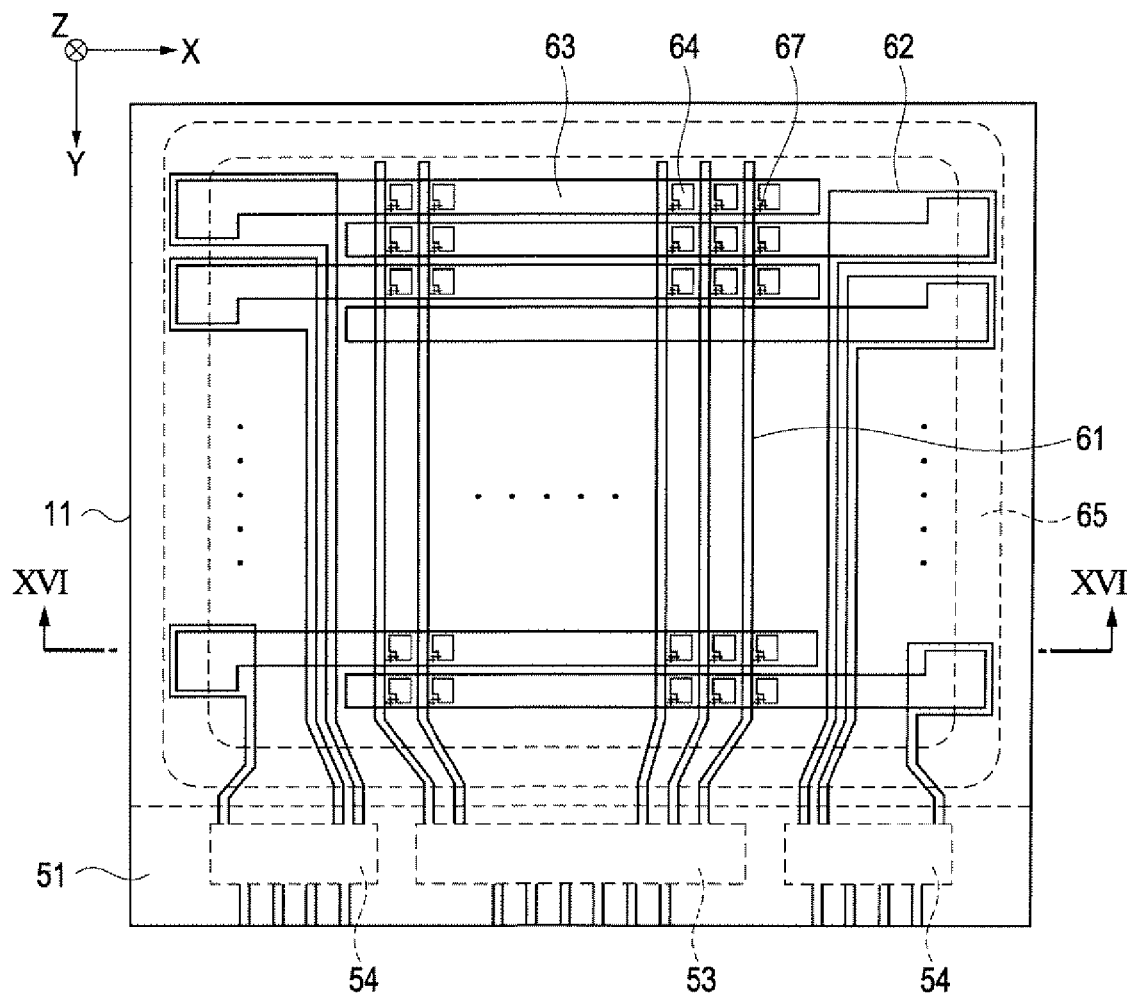
FIG. 15 is a plan view showing an arrangement of electrodes and wiring lines of the liquid crystal display device.

FIG. 15 is a plan view showing an arrangement of the electrodes and wiring lines on the upper glass substrate 51 and the color filter substrate 1. All of the electrodes and wiring lines on the upper glass substrate 51 and the color filter substrate 1 are formed on the surface of the upper glass substrate 51 which faces the color filter substrate 1, or the surface of the color filter substrate 1 which faces the upper glass substrate 51. In FIG. 15, for the purpose of convenience of description, all the electrodes and wiring lines are indicated by solid lines.

On the surface of the upper glass substrate 51 which faces the color filter substrate 1, data lines 61 and leading-about wiring lines 62, which are made of chrome, and the transparent pixel electrodes 64 made of ITO (Indium Tin Oxide) are formed. The data lines 61 and the pixel electrodes 64 are connected to one another via TFD (Thin Film Diodes) elements 67 which are nonlinear resistance elements. On the other hand, transparent scanning electrodes 63 made of ITO is formed on the surface of the color filter substrate 1 which faces the upper glass substrate 51. The TFD elements 67 and the pixel electrodes 64 are disposed corresponding to the intersections of the data lines 61 and the scanning electrodes 63. Moreover, each of the pixel electrodes 64 is disposed in a position corresponding to any one of the pixels 20R, 20G, and 20B of the color filter substrate 1.

Figure 16:
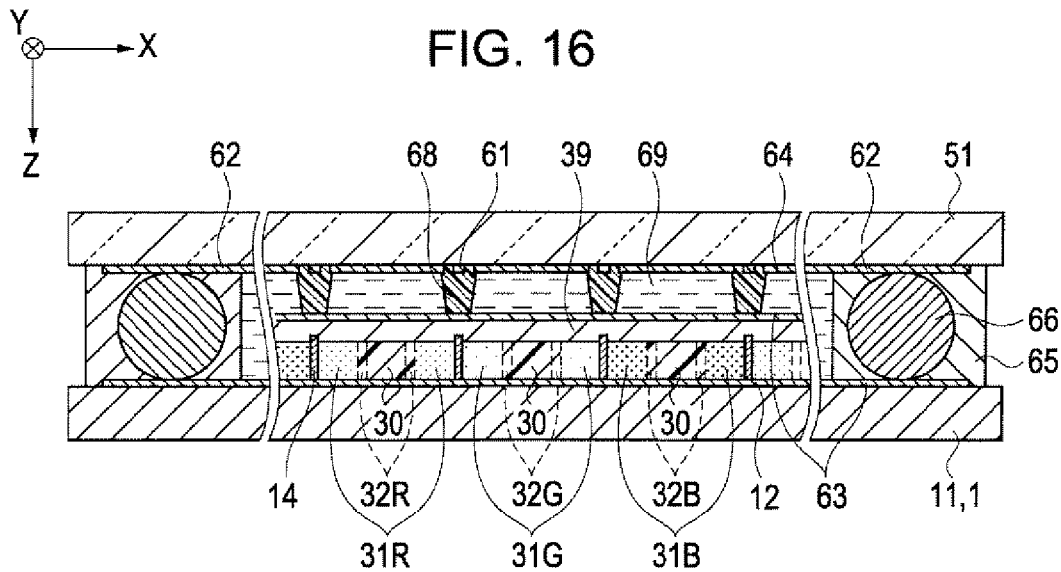
FIG. 16 is a sectional side view of a liquid crystal display device.

The leading-about wiring lines 62 and the scanning electrodes 63 are connected to one another by conductive up-and-down electrical connection particles 66 which are contained in the sealing agent 65, and its aspect is shown in FIG. 16. FIG. 16 is a sectional side view in the D-D line in FIG. 15. Moreover, as shown in FIG. 16, the upper glass substrate 51 and the color filter substrate 1 are supported by photo-spacers 68 made of pillar-shaped resin. Moreover, the spaces made by the photo-spacers 68 are filled with the liquid crystal 69. In addition, although an aligned film, etc. is further laminated on the upper glass substrate 51 and the color filter substrate 1, illustration thereof is omitted herein.

In the liquid crystal display device 400 which has such a configuration, scanning signals transmitted from the Y drivers 54 are transmitted to the scanning electrodes 63 via the leading-about wiring lines 62 and the up-and-down electrical connection particles 66, and data signals transmitted from the X driver 53 are transmitted to the pixel electrodes 64 via the data lines 61 and the TFD elements 67. The liquid crystal 69 interposed between the scanning electrodes 63 and the pixel electrodes 64 changes in its aligned state by driver voltages which are determined by these scanning signals and data signals. The liquid crystal display device 400 is a device which operates the aligned state of the liquid crystal to allow every pixel to modulate and emit incident light and performs various kinds of display by combinations of such pixels.

As the display light of the liquid crystal display device 400, there are the light which is incident from the observation side, thereafter reflected by the reflecting film 12, and emitted to the observation side, and the light which is transmitted through the transmission hole 13 of the reflecting film 12 from the back side, and is emitted to the observation side. A display mode using the former light is called a reflective mode and a display mode using the latter light is called a transmissive mode. In the liquid crystal display device 400 including the color filter substrate 1, since the display light of the transmissive mode is transmitted through any one of the coloring elements 31R, 31G, and 31B, a color-developing property becomes high. On the other hand, since the display light of the reflective mode is emitted in a state in which the light that has been transmitted through any one of the coloring elements 31R, 32R, 31G, 32G, 31B, and 32B, and the light that has been transmitted through the transparent resin 30 are mixed, luminance becomes high. In this way, the liquid crystal display device 400 has the features that the color-developing property of the transmissive mode is high and the luminance of the reflective mode is high.

Moreover, the color filter substrate 1 has a region whose transmittance changes continuously between the coloring elements 31R, 31G, and 31B and the transparent resin 30, as described above. Therefore, the liquid crystal display device 400 has the feature that the internal structure (specifically, the boundary between the coloring elements 31R, 31G, and 31B and the transparent resin 30) of the color filter substrate 1 is not easily recognized visually by an observer at the time of such display, and can perform a high-definition display.

The color filter substrate 1 of this embodiment is applicable to various electro-optical devices including organic electroluminescent (EL) display devices, LCOS (Liquid Crystal on Silicon), etc., in addition to the liquid crystal display device 400.

E. Electronic Apparatus

Figure 17:
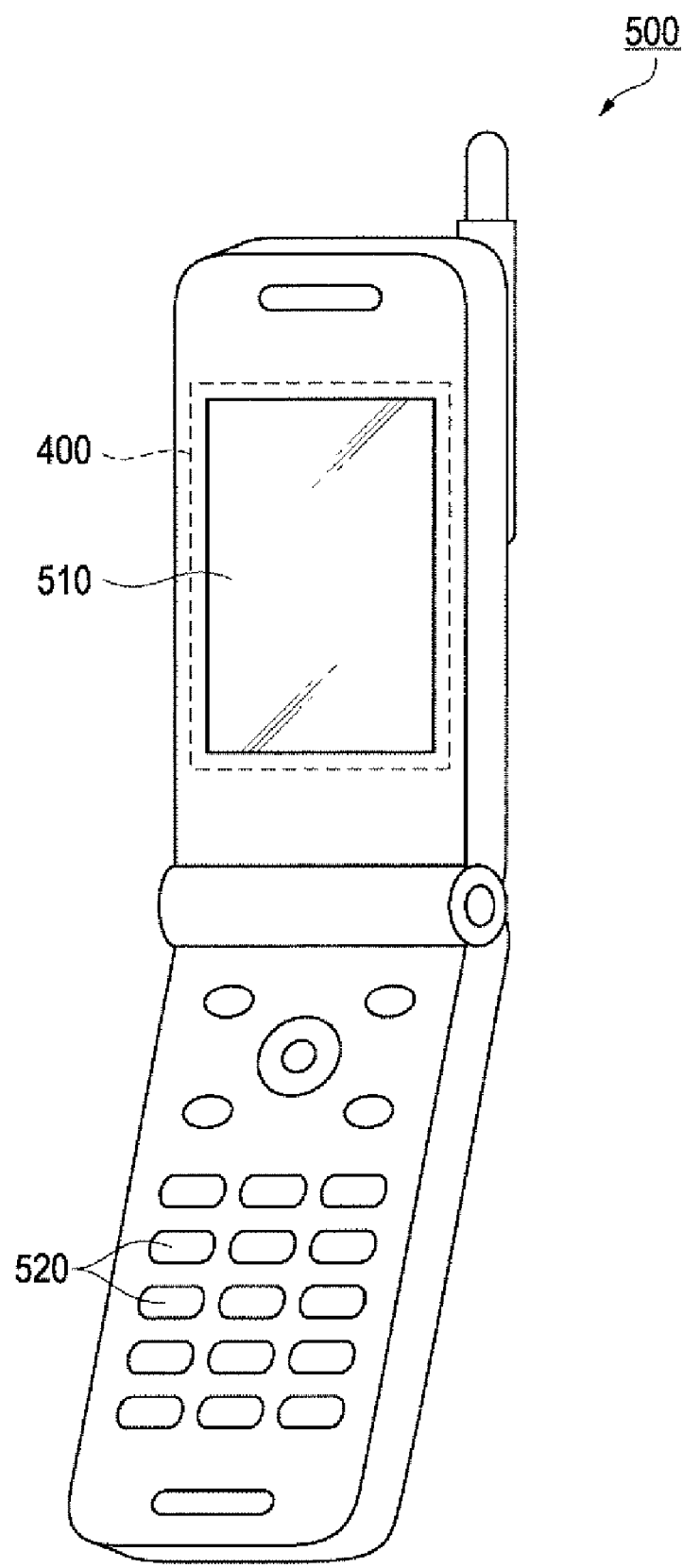
FIG. 17 is a perspective view of a portable telephone.

Subsequently, an electronic apparatus equipped with the liquid crystal display device 400 will be described. FIG. 17 is a perspective view of a portable telephone 500 as an electronic apparatus equipped with the liquid crystal display device 400. The portable telephone 500 has a display unit 510 and manual operation buttons 520. The liquid crystal display device 400 built in the portable telephone enables the display unit 510 to display various kinds of information including contents and incoming information that are input by the manual operation buttons 520. The display in the display unit 510 of this portable telephone 500 has the features that both the color-developing property of the transmissive mode, and the luminance of the reflective mode are excellent, and the internal structure (specifically, the boundary between the coloring elements 31R, 31G, and 31B and the transparent resin 30) of the color filter substrate 1 of the liquid crystal display device 400 is not easily recognized visually by an observer. Therefore, the portable telephone 500 can perform a high-definition display.

The liquid crystal display device 400 of this embodiment is applicable to various electronic apparatuses including personal computers, portable electronic terminals, watches, etc., in addition to the portable telephone 500.

Second Embodiment

In the above first embodiment, in the pixel 20, although the transparent resin 30 and the coloring element 31R (31G, 31B) are disposed in different regions and are not overlapped with each other, these can also be disposed to overlap each other. Hereinafter, a color filter substrate 2 of this embodiment will be described referring to FIGS. 8 to 10.

Figure 8A:
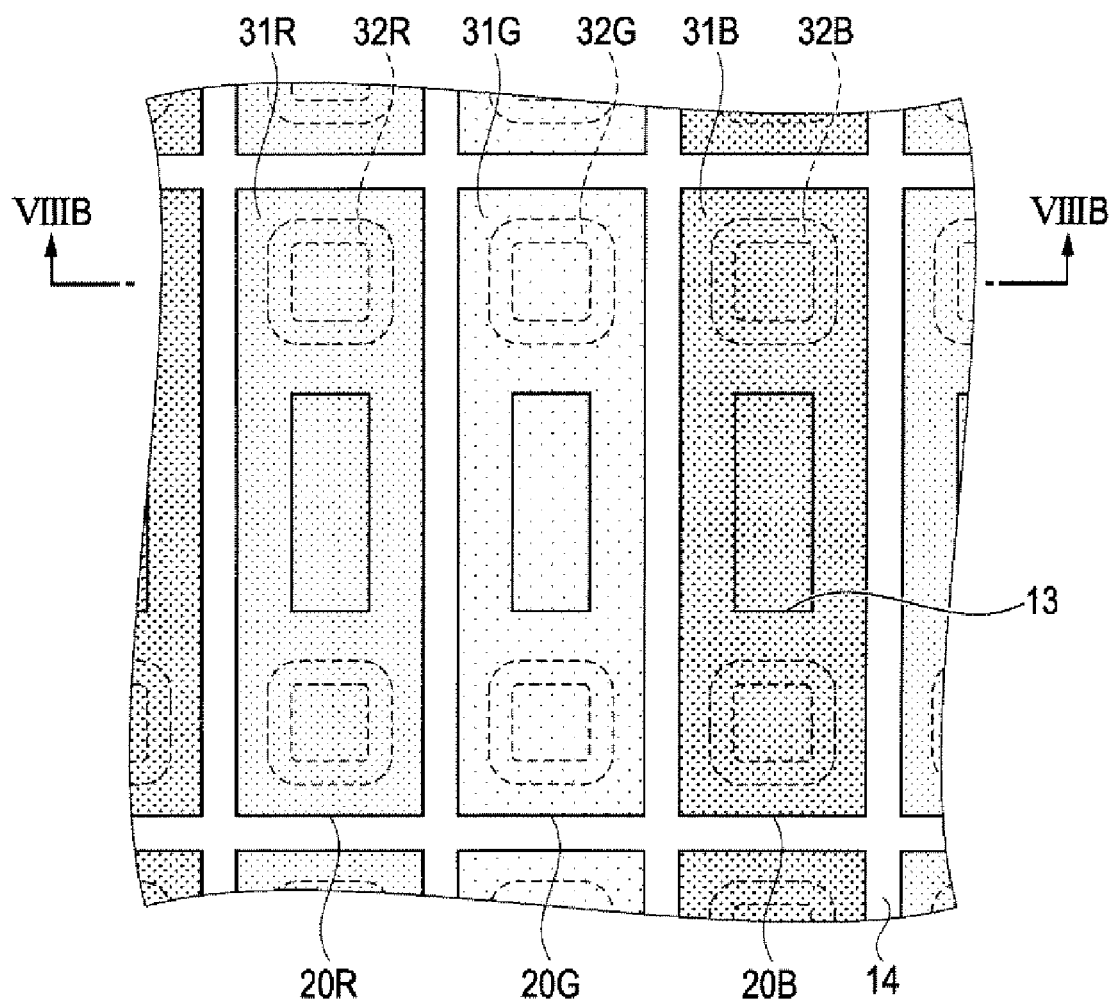
FIG. 8A is an enlarged plan view of pixels of the color filter substrate.
Figure 10A:
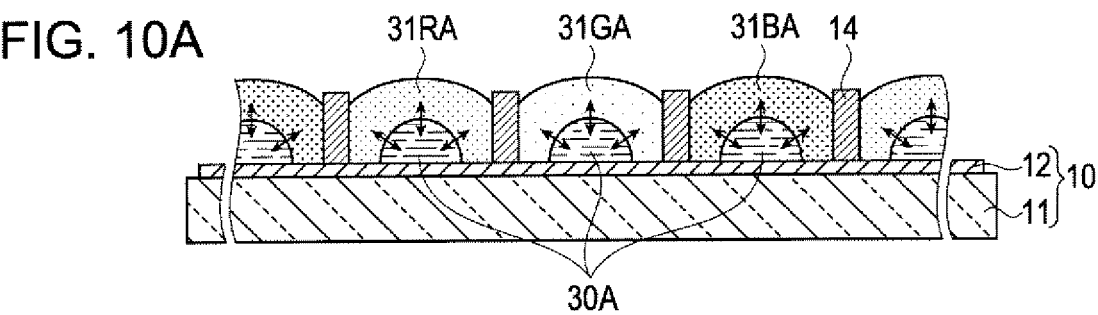
FIGS. 10A to 10C are sectional side views showing a method of manufacturing a color filter substrate.
Figure 10B:
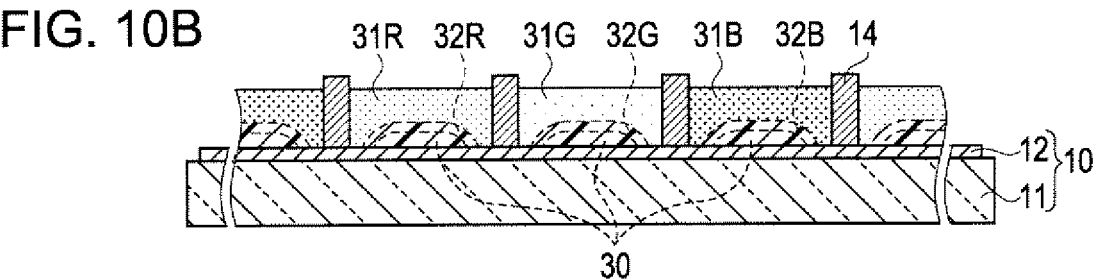
Figure 10C:
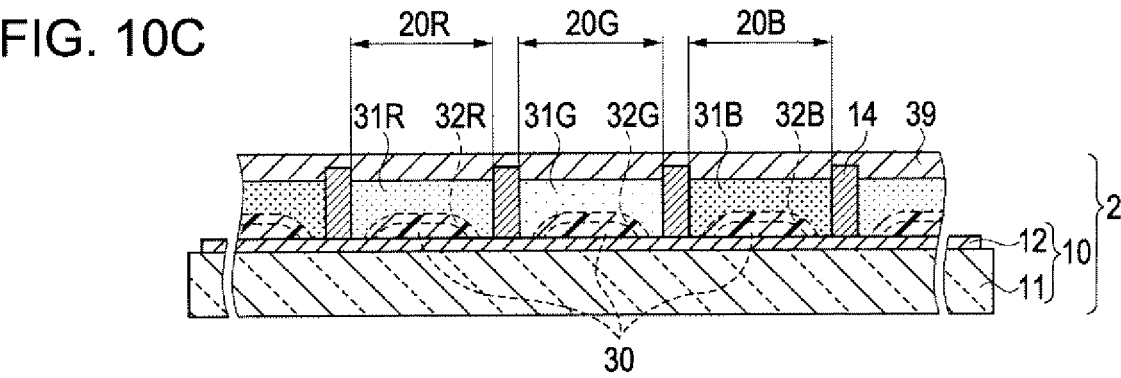

FIG. 8A is an enlarged plan view showing the pixels 20 of the color filter substrate 2, and the sectional side view taken along the A-A line in this drawing is FIG. 10C. As shown in these drawings, in the pixel 20R, the coloring element 32R covers the transparent resin 30 disposed in a portion of the surface of the reflecting film 12, and the coloring element 31R is formed over the whole pixel 20R in a state in which it covers the coloring element 32R.

According to the above configuration, since all the light that is incident from the back side, is transmitted through the transmissive region, and is emitted to the observation side is transmitted through the coloring element 31R, a color-developing property becomes high. On the other hand, since the light that is incident into the reflective region from the observation side, is reflected by the reflecting film 12, and is emitted to the observation side is not absorbed while it is transmitted through the transparent resin 30 embedded in the coloring elements 31R and 32R, luminance becomes high compared with the case where only the coloring element 31R is disposed on the whole surface. In this way, the color filter substrate 2 of this embodiment also has the features that the color-developing property of the light that is transmitted through the transmissive region is high and the reflectance in the reflective region is high.

Figure 8B:
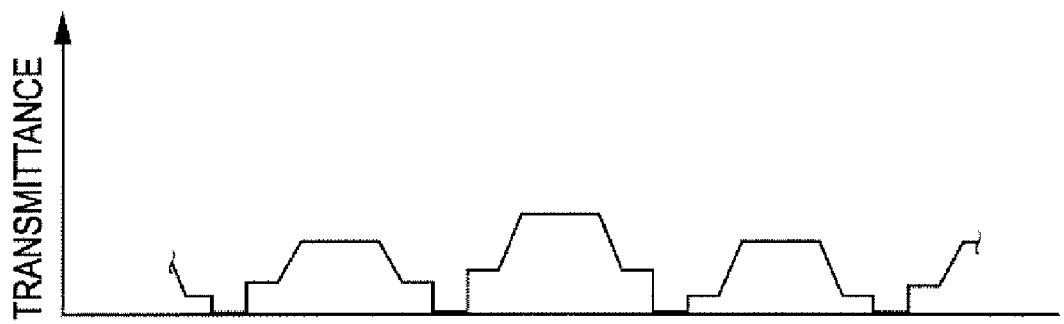
FIG. 8B is a graph showing the transmittance distribution in the pixels.

Here, the portion of the coloring element 32R which touches the coloring element 31R has the same pigment density as the coloring element 31R, while the portion of the coloring element 32R which touches the transparent resin 30 is substantially transparent similarly to the transparent resin 30. Thus, the portion between the above portions has pigment densities that change continuously. If this is put in another way from the viewpoint of transmittance, the transmittance changes continuously from the region where only the coloring element 31R is disposed to the region in which the transparent resin 30 is disposed. The features of such a transmittance are shown in FIG. 8B. FIG. 8B is a graph obtained by plotting transmittance along the A-A line in FIG. 8A. As can be seen from this drawing, in the region in which the coloring element 31R is disposed and the region in which the transparent resin 30 is disposed, a fixed transmittance is shown according to the characteristics of each resin, and transmittance changes continuously in the region in which the coloring element 32R between the regions is disposed.

Since the color filter substrate 2 has the region whose transmittance changes continuously between the coloring element 31R and the transparent resin 30 as described above, and the coloring element 31R is disposed in the whole pixel 20R so as to cover the transparent resin 30 and the coloring element 32R, it has the feature that the internal structure (specifically, the boundary between the coloring element 31R and the transparent resin 30) is not easily recognized visually by an observer.

In addition, the color filter substrate 2 further has the pixel 20G and the pixel 20B which have the same configuration as the above-described pixel 20R. The above description of the pixel 20R becomes description of the pixel 20G or the pixel 20B by reading "R" as "G" or "B", respectively.

Subsequently, a method of manufacturing a color filter substrate 2 will be described, referring to FIGS. 9 and 10.

Figure 9A:
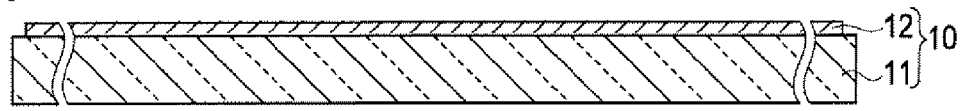
FIGS. 9A to 9D are sectional side views showing a method of manufacturing a color filter substrate.

First, a reflecting film 12 composed of an aluminum thin film is formed on a glass substrate 11 to manufacture a base member 10, using a well-known film-forming technique and a well-known patterning technique (FIG. 9A). At this time, a transmission hole 13 is also formed at the same time.

Figure 9B:
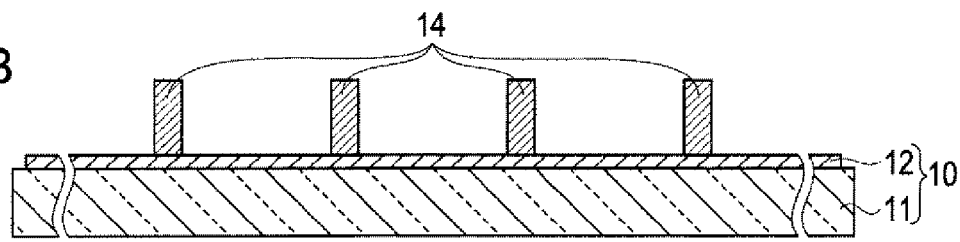
Figure 9C:
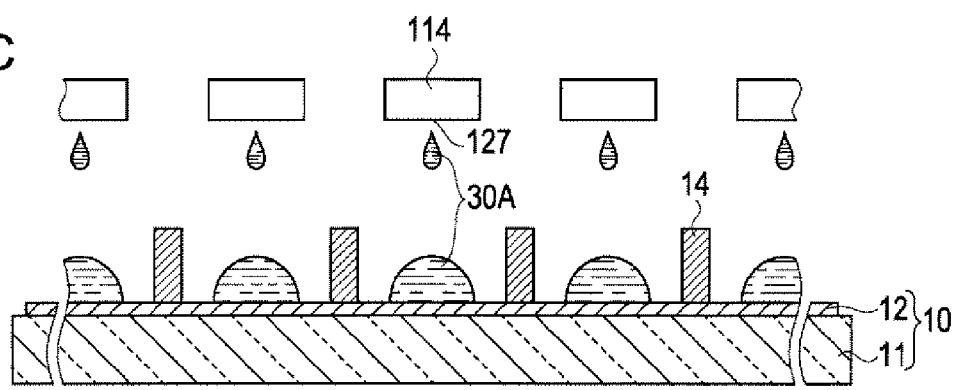

Next, a partition wall 14 is formed by applying a resin organic thin film on the base member 10, and patterning this by photolithography (FIG. 9B). This step corresponds to the "first step" in the invention.

The base member 10 on which the partition wall 14 is formed is carried to the stage 106 of the droplet discharge apparatus 300. Then, as shown in a FIG. 9C, the droplet discharge apparatus 300 applies the first functional liquid 30A from the discharge section 127 of the head 114 to a portion of the region in which the reflecting film 12 is formed, in the concave part defined by the surface of the base member 10, and the side surfaces of the partition walls 14. The applied first functional liquid 30A is disposed in a portion of the concave part, without getting wet and spreading in the whole concave part by its surface tension. This step corresponds to the "second step" in the invention.

Figure 9D:
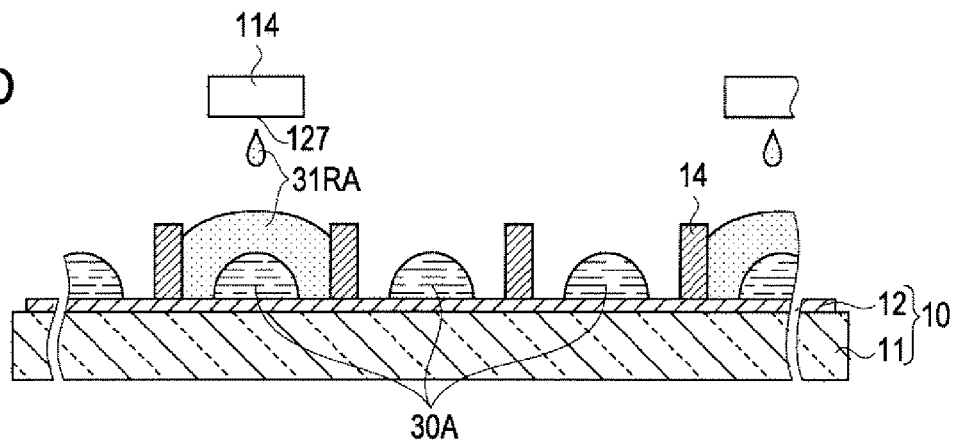

The base member 10 on which the first functional liquid 30A has been applied is carried to the stage 106 of a droplet discharge apparatus for discharging the second functional liquid. Then, as shown in FIG. 9D, the droplet discharge apparatus applies the second functional liquid 31RA from the discharge section 127 of the head 114 to the whole concave part corresponding to the pixel 20R. At the time when this step has been completed, the concave part corresponding to the pixel 20R will be in a state where it is filled with the first functional liquid 30A and second functional liquid 31RA.

Subsequently, the base member 10 is sequentially carried to a droplet discharge apparatus for discharging the functional liquid 31GA and a droplet discharge apparatus for discharging the functional liquid 31BA, by which the second functional liquid 31GA, and second functional liquid 31BA are applied to the base member (FIG. 10A). The second functional liquid 31GA and 32BA are applied onto the whole concave parts corresponding to the pixel 20G and 20B, respectively. In this way, any one kind of liquid of the first functional liquid 30A, and the second functional liquids 31RA, 31GA and 31BA is applied to each of all the pixels 20. The above step of applying the second functional liquids 31RA, 31GA, and 31BA corresponds to the "third step" in the invention.

Here, since the solvent of the first functional liquid 30A and the solvent of the second functional liquids 31RA, 31GA, and 31BA are the same, as indicated by the arrow in FIG. 10A, portions of these functional liquids are mixed in the vicinity of a boundary. The density of a pigment in such a mixed region becomes lower than the coloring element 31R (31G, 31B). As a result, the nearer the region in which the first functional liquid 30A is applied, the higher the distribution thereof becomes, while the nearer the region in which the second functional liquid 31RA (31GA, 31BA) is disposed, the higher the distribution thereof becomes.

Next, the base member 10 in the above state is left and dried in a high temperature environment. After passing through the drying step, the solvent in each functional liquid is evaporated. As a result, the transparent resin 30 is formed in the region in which the first functional liquid 30A is applied, the coloring elements 31R, 31G, and 31B are formed in the region in which the second functional liquids 31RA, 31GA, and 31BA are applied, and the coloring elements 32R, 32G, and 32B which have a region whose pigment density changes continuously are formed in the above-mentioned mixed region (FIG. 10B).

Finally, an overcoat 39 made of resin having translucency is formed so as to cover the transparent resin 30, various coloring elements 31R, 31G, 31B, 32R, 32G, and 32B, and partition walls 14, which are formed above (FIG. 10C). The formation of the overcoat 39 is performed, for example, using a spin coat method and photolithography. The color filter substrate 2 is completed through the above steps.

Third Embodiment

As one of the embodiments of the invention, there is a color filter substrate in which two kinds of coloring elements whose hues are almost the same and whose pigment densities are different from each other are disposed in every pixel. In the following, a method of manufacturing a color filter substrate 3 will be described, referring to FIGS. 11 and 12.

Figure 11A:
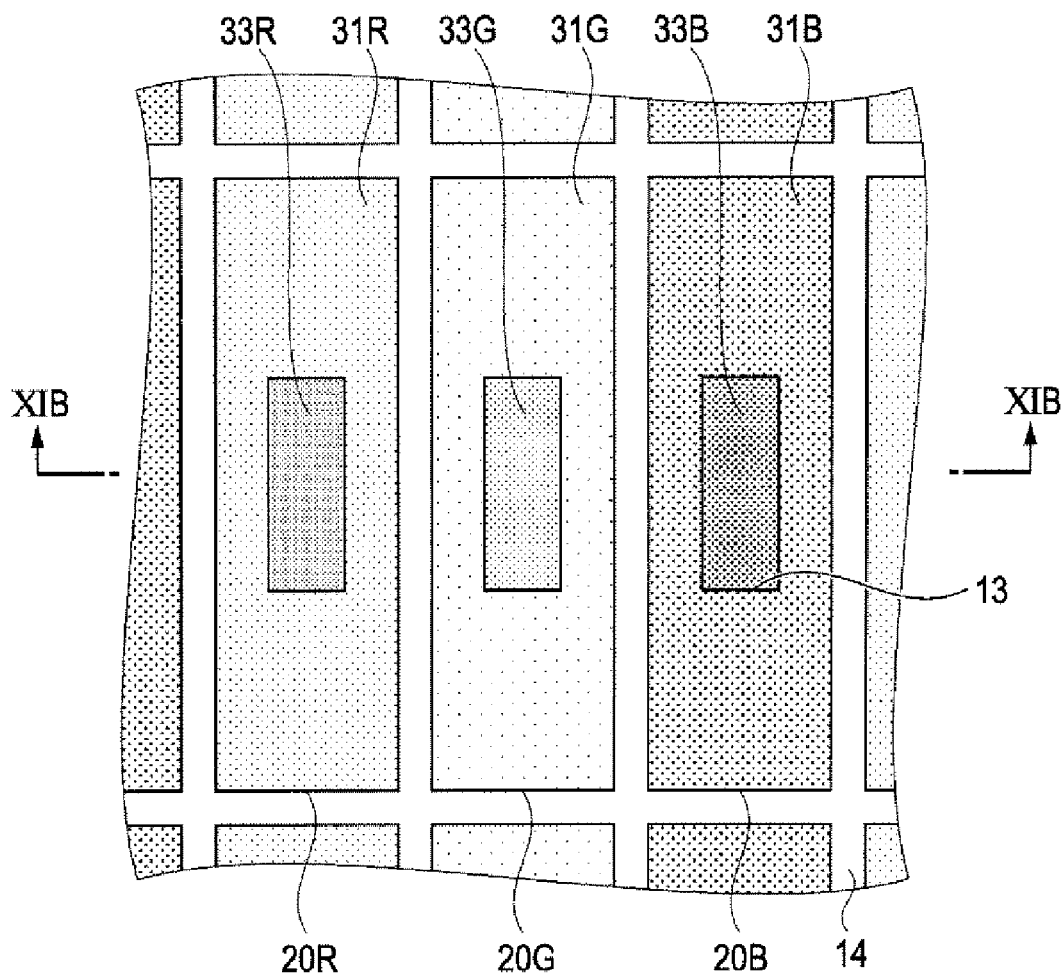
FIG. 11A is an enlarged plan view of pixels of the color filter substrate.
Figure 11B:
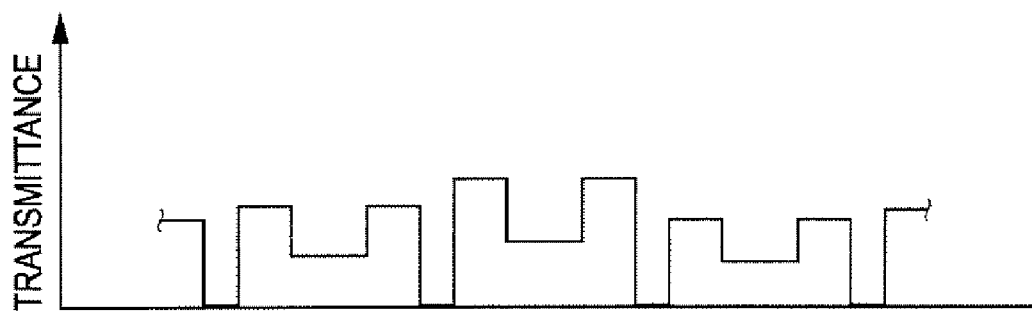
FIG. 11B is a graph showing the transmittance distribution in the pixels.
Figure 12A:
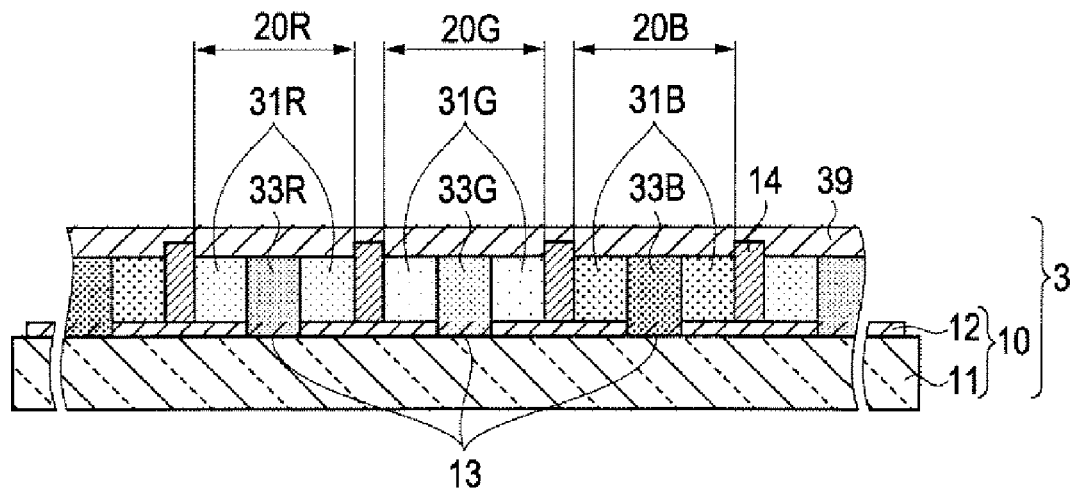
FIGS. 12A and 12B are sectional side views of a color filter substrate.

FIG. 11A is an enlarged plan view showing the pixels 20 of the color filter substrate 3, and the sectional side view taken along the C-C line in this drawing is FIG. 12C. As shown in these drawings, in the pixel 20R, the coloring element 31R is disposed in the reflective region, and the coloring element 33R is disposed in the transmissive region. Here, the coloring element 31R and the coloring element 33R has the same hue (red), and has a pigment density higher than the coloring element 31R. Accordingly, the light that has been transmitted through the coloring element 31R becomes light which is relatively deep red and relatively lower in luminance, compared with the light that has been transmitted through the coloring element 33R. FIG. 11B is a graph obtained by plotting transmittance along the C-C line in FIG. 11A. As can be seen from this drawing, the transmittance of the region in which the coloring element 33R is disposed is lower than the transmittance of the region in which the coloring element 31R is disposed.

According to the above configuration, since all the light that is incident from the back side, is transmitted through the transmissive region, and is emitted to the observation side is transmitted through the coloring element 33R, a color-developing property becomes high. On the other hand, since all the light that is incident from the observation side and is reflected by the reflecting film 12 and is emitted to the observation side is transmitted through the coloring element 31R, luminance becomes high. In this way, the color filter substrate 3 of this embodiment also has the features that the color-developing property of the light that is transmitted through the transmissive region is high and the reflectance in the reflective region is high.

In addition, the color filter substrate 3 further has the pixel 20G and the pixel 20B which have the same configuration as the above-described pixel 20R. The above description of the pixel 20R becomes description of the pixel 20G or the pixel 20B by reading "R" as "G" or "B", respectively.

The color filter substrate 3 can be basically manufactured by the same manufacturing method as the above first embodiment. The manufacturing method is different from the manufacturing method of the above first embodiment in that functional liquids 33RA, 33GA, and 33BA (not shown) containing a resin having a higher pigment density than the second functional liquids 31RA, 31GA, and 31BA are used as the functional liquid, the first functional liquids 33RA, 33GA, and 33BA are applied to a transmissive region, and a drying step is included after the first functional liquids 33RA, 33GA, and 33BA are applied. By applying the first functional liquids 33RA, 33GA, and 33BA and drying them, the formation region of the coloring elements 33R, 33G, and 33B can be exactly matched with a transmissive region. As the solvent of the second functional liquids 31RA, 31GA, and 31BA, it is preferable to use a solvent what hardly dissolves the coloring elements 33R, 33G, and 33B so that the coloring elements 33R, 33G, and 33B may not be dissolved again in continuing application of the second functional liquids 31RA, 31GA, and 31BA. However, the first functional liquids 33RA, 33GA, and 33BA may be dissolved again by the second functional liquids 31RA, 31GA, and 31BA, and a mixed region may be formed at a boundary therebetween.

Figure 12B:
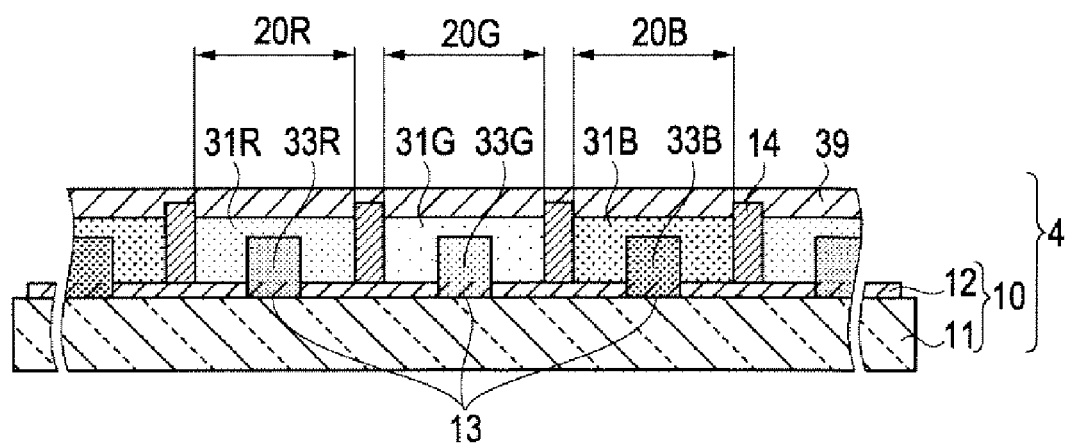

Here, the second functional liquids 31RA, 31GA, and 31BA may be applied onto the whole surface of the pixel 20, including a transmissive region. According to such a manufacturing method, a color filter substrate 4 shown in a sectional side view to FIG. 12B is obtained. In the color filter substrate 4, the coloring elements 31R, 31G, and 31B are laminated on the coloring elements 33R, 33G, and 33B, respectively. The color filter substrate 4 of such a configuration also has the features that the color-developing property of the light that is transmitted through the transmissive region is high and the reflectance in the reflective region is high. Moreover, since coloring elements whose hues are almost the same are formed in the same concave part, the color filter substrate has a feature that the internal structure is not easily recognized visually by an observer.

Although the invention has been described hitherto with reference to specific embodiments thereof, it will be apparent to one skilled in the art that various changes and modifications can be made thereto without departing from the spirit and scope thereof. As the modifications, for example, the following ones can be considered.

Modification 1

In the method of manufacturing a color filter substrate shown in the above first and second embodiments, after the first functional liquid 30A has been applied, the step of drying the first functional liquid 30A may be included. In this case, the second functional liquid 31RA (31GA, 31BA) is applied to a concave part which has the transparent resin 30 which has been dried by the first functional liquid 30A. At this time, since the solvent of the second functional liquid 31RA (31GA, 31BA) resolves a portion of the transparent resin 30, mixing of the first functional liquid 30A and second functional liquid 31RA (31GA, 31BA) takes place. Subsequently, if the functional liquids 30A and 31RA (31GA, 31BA) are dried, the coloring element 32R (32G, 32B) which has a region whose pigment density changes continuously is formed, and a color filter substrate that the internal structure is not easily recognized visually by an observer can be manufactured.

Modification 2

Although the transparent resin 30 is formed in a portion of the reflective region in the above first and second embodiments, a coloring element whose hue is almost the same as the coloring elements 31R, 31G, and 31B and whose pigment density is lower than each of the coloring elements 31R, 31G, and 31B may be formed instead. By this configuration, it is also possible to obtain a color filter substrate which has the features that the color-developing property of the light that is transmitted through a transmissive region is high, the reflectance in a reflective region is high, and the internal structure is not easily recognized visually by an observer.

Modification 3

Although the step of applying the second functional liquid 31RA (31GA, 31BA) after the first functional liquid 30A has been applied is included in the method of manufacturing a color filter substrate shown in the above first embodiment, a step of applying the first functional liquid 30A after the second functional liquid 31RA (31GA, 31BA) has been applied may be included instead. By this manufacturing method, the same color filter substrate as the first embodiment can also be manufactured.

Modification 4

In the method of manufacturing a color filter substrate shown in the above second embodiment, the first functional liquid 30A may be applied onto the whole region of a concave part in which the reflecting film 12 is formed. A color filter substrate obtained by this manufacturing method, has a laminated structure of the glass substrate 11, the reflecting film 12, the transparent resin 30, the coloring element 32R (32G, 32B), the coloring element 31R (31G, 31B), and the overcoat 39, in the region in which the reflecting film 12 is formed, and has a laminated structure of the glass substrate 11, the coloring element 31R (31G, 31B), and the overcoat 39, in the region in which the reflecting film 12 is not formed. By this configuration, it is also possible to obtain a color filter substrate which has the features that the color-developing property of the light that is transmitted through a transmissive region is high, the reflectance in a reflective region is high, and the internal structure is not easily recognized visually by an observer.

Modification 5

The above first and third embodiments can be used in combination with each other. Specifically, the coloring element 33R (33G, 33B) with high density like the third embodiment is formed in a transmissive region, and, the transparent resin 30, the coloring element 32R (32G, 32B), and the coloring element 31R (31G, 31B) are formed in a reflective region like the first embodiment. Otherwise, the above first and third embodiments can be used in combination with each other. In this case, the coloring element 33R (33G, 33B) with high density like the third embodiment is formed in a transmissive region, and, the transparent resin 30, the coloring element 32R (32G, 32B), and the coloring element 31R (31G, 31B) are formed to be laminated in a portion of a reflective region like the second embodiment. By these configurations, it is also possible to obtain a color filter substrate which has the features that the color-developing property of the light that is transmitted through a transmissive region is high, the reflectance in a reflective region is high, and the internal structure is not easily recognized visually by an observer.

Modification 6

Figure 13A:
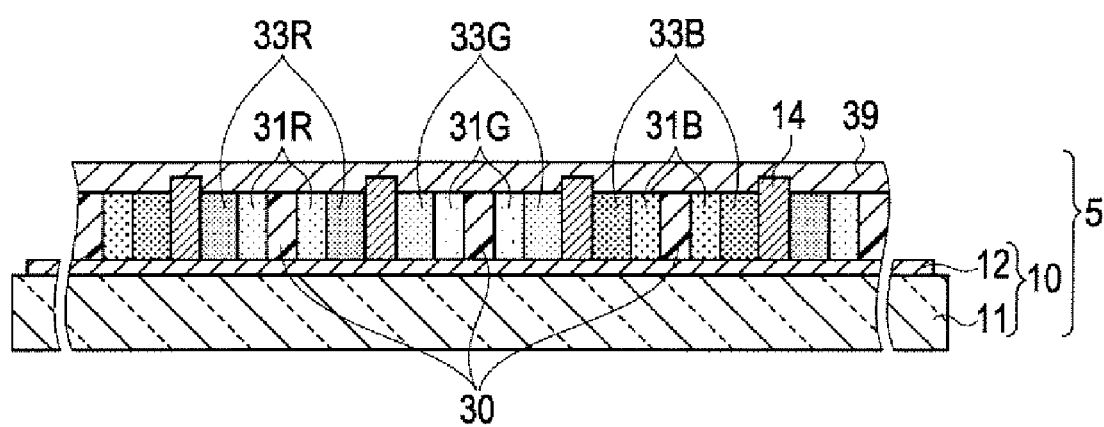
FIGS. 13A and 13B are sectional side views of a color filter substrate.

In implementation of the invention, three or more kinds of functional liquids may be applied to one concave part. FIG. 13A is a sectional side view of a color filter substrate 5 manufactured by applying three kinds of functional liquids to one concave part. In the color filter substrate 5, the coloring element 33R (33G, 33B), the coloring element 31R (31G, 31B), and the transparent resin 30 are formed sequentially from the region near the partition wall 14 in a reflective region. These are formed by applying different functional liquids from a droplet discharge apparatus through steps that are different from one another. By this configuration, it is possible to obtain a color filter substrate that the internal structure is not easily recognized visually by an observer.

Modification 7

Figure 13B:
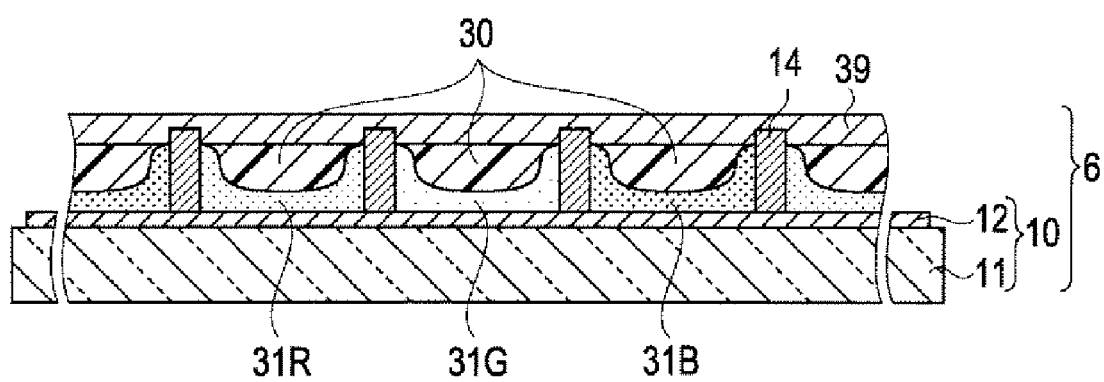

Coloring elements to be formed in a concave part may be formed while their thickness is partially changed. FIG. 13B is a sectional side view of a color filter substrate 6 in which the thickness of the partition walls 14 near the coloring element 31R (31G, 31B) is larger than the thickness of other regions. This color filter substrate 6 is manufactured by forming the coloring element 31R (31G, 31B) and the transparent resin 30 in this order on the reflecting film 12. By slowly drying the functional liquid 31RA (31GA, 31BA), the coloring element 31R (31G, 31B) is formed in a state in which a solute is biased nearer to the partition walls 14. The transparent resin 30 is formed in a depression formed by the coloring element 31R (31G, 31B). In the color filter substrate 6 of such a configuration, since the thickness of the transparent resin 30 and the coloring element 31R (31G, 31B) changes continuously by location, the transmittance also changes continuously accordingly. Therefore, the color filter substrate has the feature that the internal structure is not easily recognized visually by an observer.

Modification 8

In the above respective embodiments, although the base member 10 has the reflecting film 12, a configuration in which the base member 10 does not have a reflecting film 12 can be adopted instead. In a case in which a reflective electro-optical device is manufactured using such a color filter substrate, a reflecting film has only to be formed on a substrate which faces a color filter substrate. In this case, the direction that the color filter substrate is observed can be reversed to the above respective embodiments.

Modification 9

In the above respective embodiments, although the position of the transmission hole 13 is disposed approximately in the center of the pixel 20, the transmission hole can instead be formed in arbitrary positions as long as it is within the pixel 20. For example, the transmission hole 13 can be brought closer to the end of the pixel 20 and formed therein, and a mass of remaining region can also be used as a reflective region. Thereby, the transparent resin 30 formed in a reflective region can be brought into one.

Modification 10

In the above respective embodiments, although all the pixels 20R, 20G, and 20B corresponding to red, green, and blue have the same area, a configuration in which the areas of the pixels are different from one another may be adopted instead. By making the area of a pixel 20 of a certain color relatively larger than the area of pixels 20 of other colors, the luminance of the color in a color filter substrate can be improved. Thereby, the color-developing property of the color filter substrate can be adjusted by both the density of each coloring element and the area of the pixel 20.

Modification 11

The respective embodiments and the respective modifications may be differently applied to every pixel 20. For example, the first embodiment may be applied to the red pixel 20R, the second embodiment may be applied to the green pixel 20G, and the third embodiment may be applied to the blue pixel 20B.

Modification 12

In the above-described embodiments, different droplet discharge apparatuses discharge the first functional liquid 30A, and the second functional liquids 31RA, 31GA, and 31BA, respectively. Instead of such a configuration, a configuration in which one droplet discharge apparatus (for example, the droplet discharge apparatus 300) discharges all the functional liquids may be adopted. In this case, these functional liquids may be discharged from separate nozzles 118 in the droplet discharge apparatus 300, and may be discharged from one nozzle 118 in the droplet discharge apparatus 300. In a case in which these two functional liquids are discharged from one nozzle 118, a step of cleaning a path from the tank 101 to the nozzle 118 has only to be added when a functional liquid is switched to the other.

What is claimed is:

1. A color filter substrate comprising:
   partition walls formed on a base member, and
   a coloring element disposed in a concave part defined by the surface of the base member and side surfaces of the partition walls,
   wherein the coloring element has a region intermediate the side surfaces that is formed of a first functional material intermixed with a second functional material, the second functional material including a pigment corresponding to a color of the coloring element, the first and second functional materials being intermixed such that a density of the pigment in the region changes continuously along a direction parallel to the surface of the base member.

2. An electro-optical device comprising the color filter substrate according to claim 1.

3. An electronic apparatus comprising the electro-optical device according to claim 2.

* * * * *